United States Patent
Crotty, III et al.

(10) Patent No.: US 6,641,198 B2
(45) Date of Patent: Nov. 4, 2003

(54) CLIP LOCK VISOR

(75) Inventors: Willard E. Crotty, III, Quincy, MI (US); Jeffrey L. Beaver, Indianapolis, IN (US); James (Jud) Hobson, Jonesville, MI (US); Glenn Snyder, Quincy, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/309,844

(22) Filed: Dec. 4, 2002

(65) Prior Publication Data

US 2003/0080578 A1 May 1, 2003

Related U.S. Application Data

(62) Division of application No. 09/788,241, filed on Feb. 16, 2001.

(51) Int. Cl.⁷ .................................................. B60J 3/00
(52) U.S. Cl. ................... 296/97.1; 296/97.2; 296/97.5
(58) Field of Search .............................. 296/97.1, 97.12, 296/97.5, 97.2, 97.8, 97.9; 356/390; 362/137; 264/45.4

(56) References Cited

U.S. PATENT DOCUMENTS

| 1,963,393 A | | 6/1934 | Woodall |
| 3,128,121 A | | 4/1964 | Greig |
| 3,827,748 A | | 8/1974 | Herr et al. |
| 3,858,983 A | * | 1/1975 | Foster et al. ............ 356/390 |
| 4,353,591 A | | 10/1982 | Cziptschirsch |
| 4,576,409 A | | 3/1986 | Ebert |
| 4,763,946 A | | 8/1988 | Robbins et al. |
| 4,988,140 A | * | 1/1991 | Van Order ............ 296/97.2 |
| 4,998,765 A | | 3/1991 | Van Order et al. |
| 4,998,767 A | * | 3/1991 | Lawassani et al. ...... 296/97.1 |
| 5,031,951 A | | 7/1991 | Binish |
| 5,054,839 A | * | 10/1991 | White et al. ............ 296/97.1 |
| 5,131,711 A | * | 7/1992 | Laferle .................. 296/97.1 |

(List continued on next page.)

FOREIGN PATENT DOCUMENTS

| DE | 3441177 A1 | 10/1984 |
| DE | 4123117 A1 | 12/1991 |
| EP | 0275903 A1 | 11/1988 |
| FR | 2727904 A1 | 12/1994 |
| JP | 6390428 A1 | 4/1988 |

*Primary Examiner*—Kiran Patel
(74) *Attorney, Agent, or Firm*—Rader, Fishman & Grauer, PLLC

(57) ABSTRACT

A sun visor, which generally includes a foundation which maybe folded unto itself to form two foundation halves, and an upholstery cover disposed over the foundation, the foundation halves include connecting elements which engage one another to secure the foundation halves together. Additionally, a frame member may be disposed between the folded foundation halves, the frame member including connecting elements which engage corresponding connecting elements of the foundation halves to secure the foundation halves to the frame member. For example, in one embodiment, a plurality of clips may be integrally formed in a pair of connecting strips which are each associated with a foundation half, the clips of the connecting strips engaging one another when the foundation halves are pressed together to secure the foundation halves together.

13 Claims, 16 Drawing Sheets

U.S. PATENT DOCUMENTS

| | | | |
|---|---|---|---|
| 5,161,850 A | | 11/1992 | Redder et al. |
| 5,205,639 A | * | 4/1993 | White et al. ................. 362/137 |
| 5,292,476 A | | 3/1994 | Jones |
| 5,308,136 A | | 5/1994 | Schwarz et al. |
| 5,308,137 A | * | 5/1994 | Viertel et al. ............... 296/97.1 |
| 5,327,633 A | | 7/1994 | Riddle, Jr. |
| 5,338,082 A | | 8/1994 | Miller |
| 5,365,416 A | * | 11/1994 | Peterson .................... 296/97.5 |
| 5,454,616 A | * | 10/1995 | Aymerich et al. .......... 296/97.1 |
| 5,466,405 A | * | 11/1995 | Viertel et al. .............. 264/45.4 |
| 5,556,154 A | | 9/1996 | Vaxelaire |
| 5,580,118 A | * | 12/1996 | Crotty, III .................. 296/97.1 |
| 5,695,237 A | | 12/1997 | Erickson et al. |
| 5,716,092 A | | 2/1998 | Dellinger et al. |
| 5,823,603 A | | 10/1998 | Crotty, III |
| 5,887,933 A | | 3/1999 | Peterson |
| 5,984,398 A | | 11/1999 | Crotty, III |
| 6,033,005 A | * | 3/2000 | Crotty, III ................... 296/97.1 |
| 6,131,985 A | * | 10/2000 | Twietmeyer et al. ....... 296/97.1 |
| 6,199,934 B1 | | 3/2001 | Sturt |
| 6,254,168 B1 | | 7/2001 | Crotty, III |
| 6,302,467 B1 | | 10/2001 | Crotty, III et al. |
| 6,347,824 B1 | | 2/2002 | Akouri et al. |
| 6,367,861 B1 | * | 4/2002 | Crotty, III et al. ......... 296/97.1 |
| 6,409,245 B1 | * | 6/2002 | Crotty, III et al. ......... 296/97.1 |
| 2001/0024048 A1 | | 9/2001 | Hobson et al. |

* cited by examiner

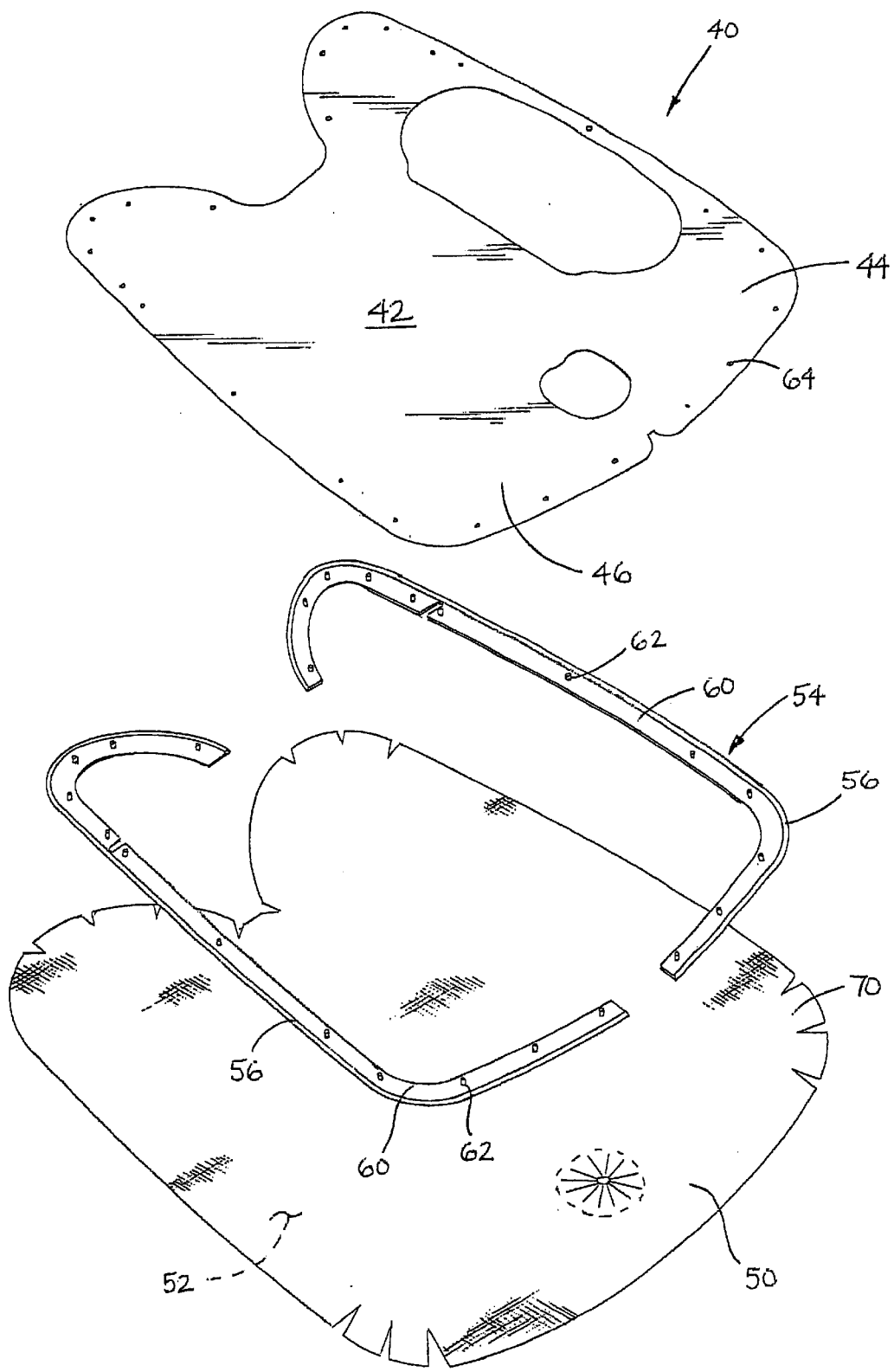
FIG_1
PRIOR ART

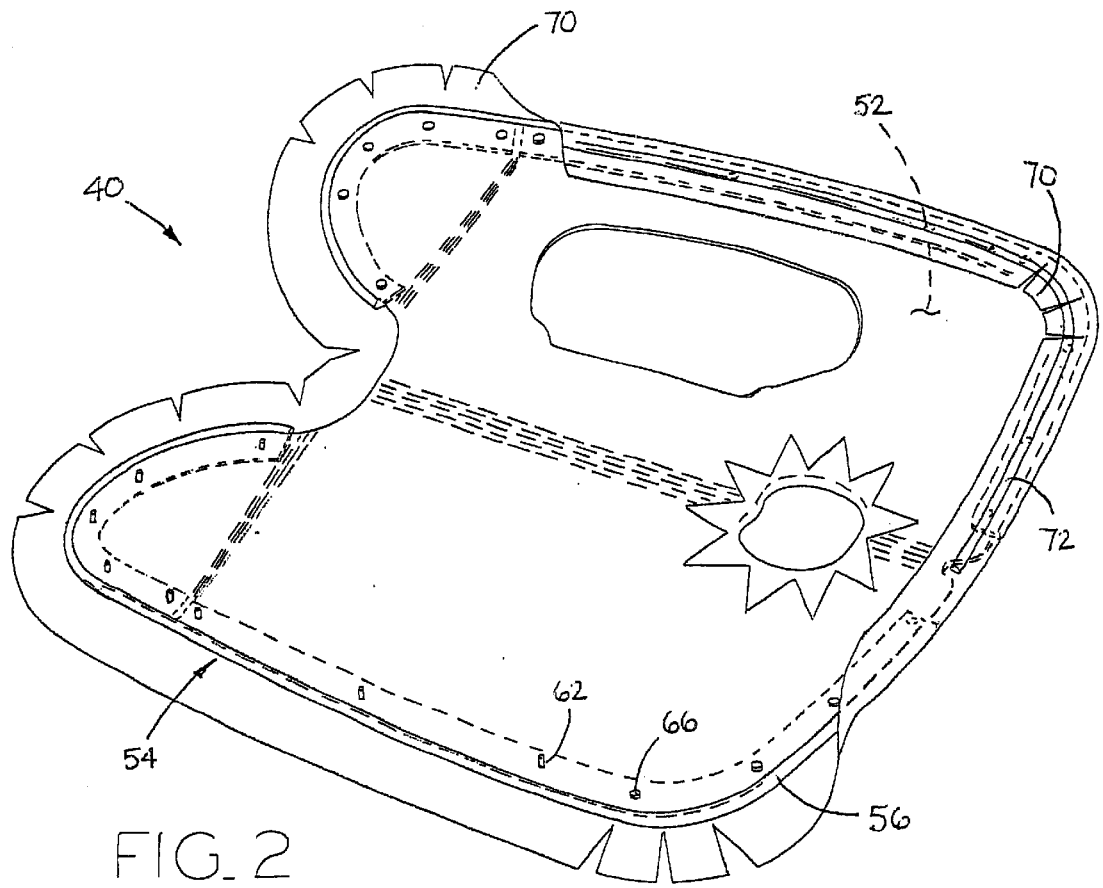
FIG_2
PRIOR ART
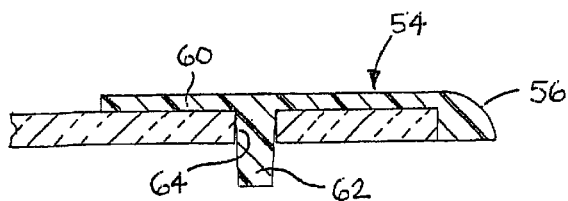
FIG_3
PRIOR ART
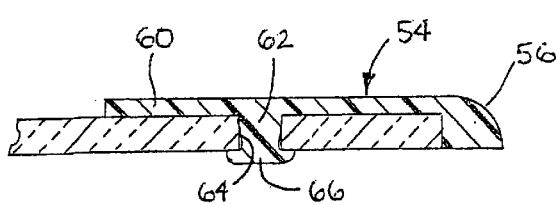
FIG_4
PRIOR ART
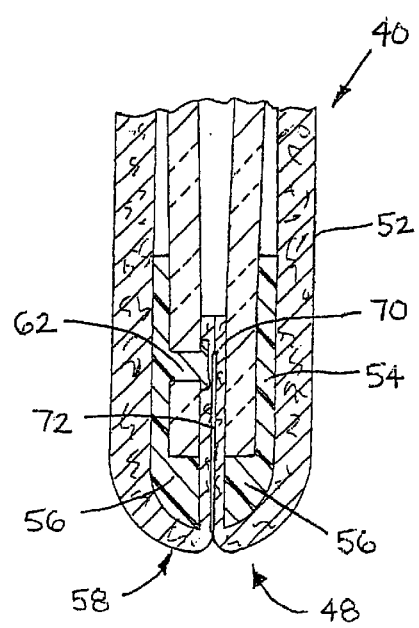
FIG_5
PRIOR ART

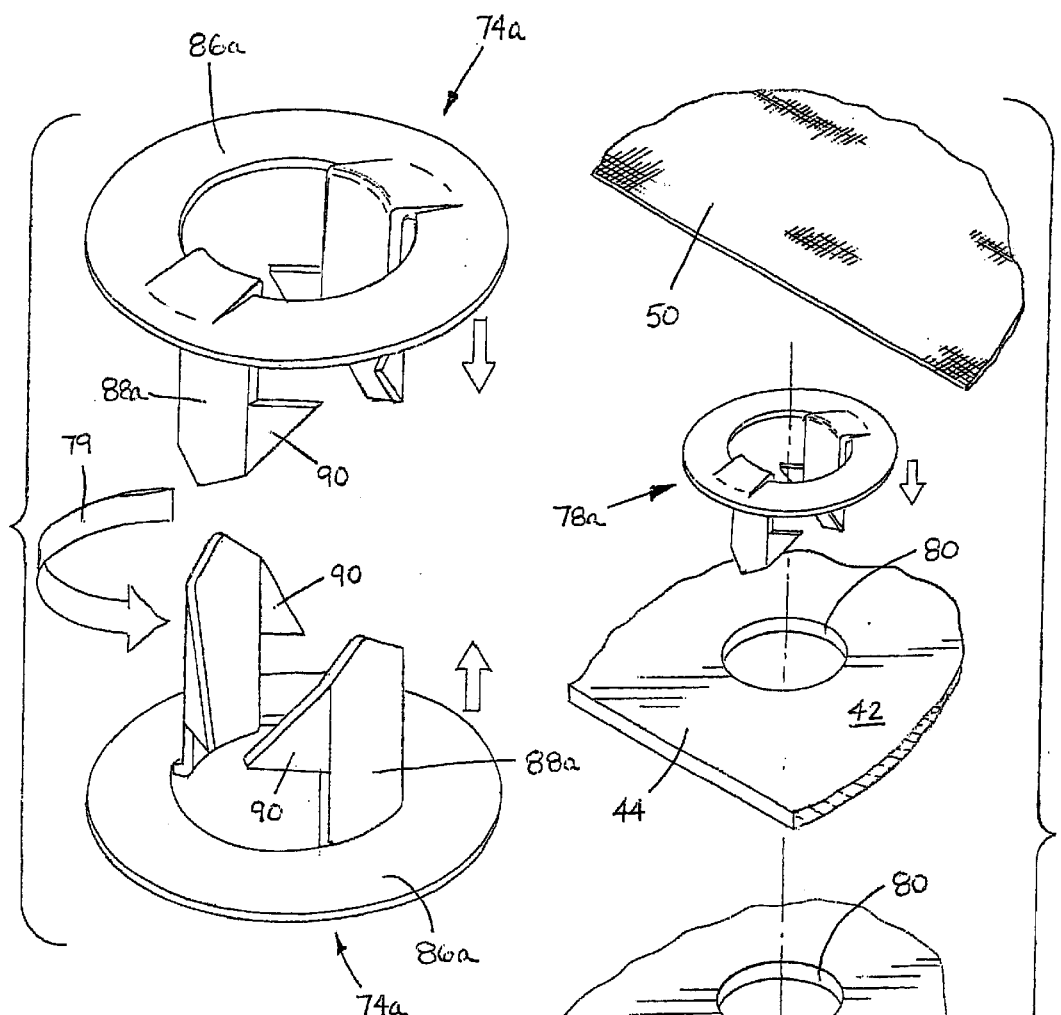
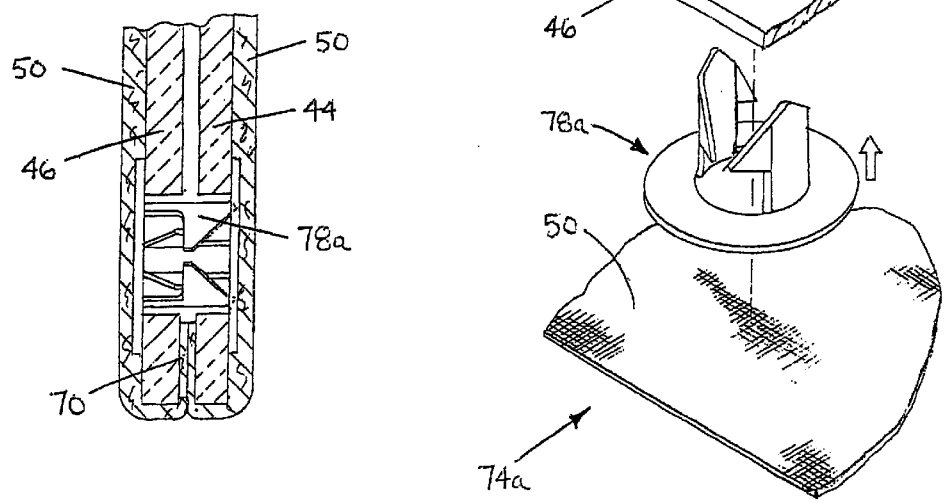
FIG. 6
FIG. 8
FIG. 7

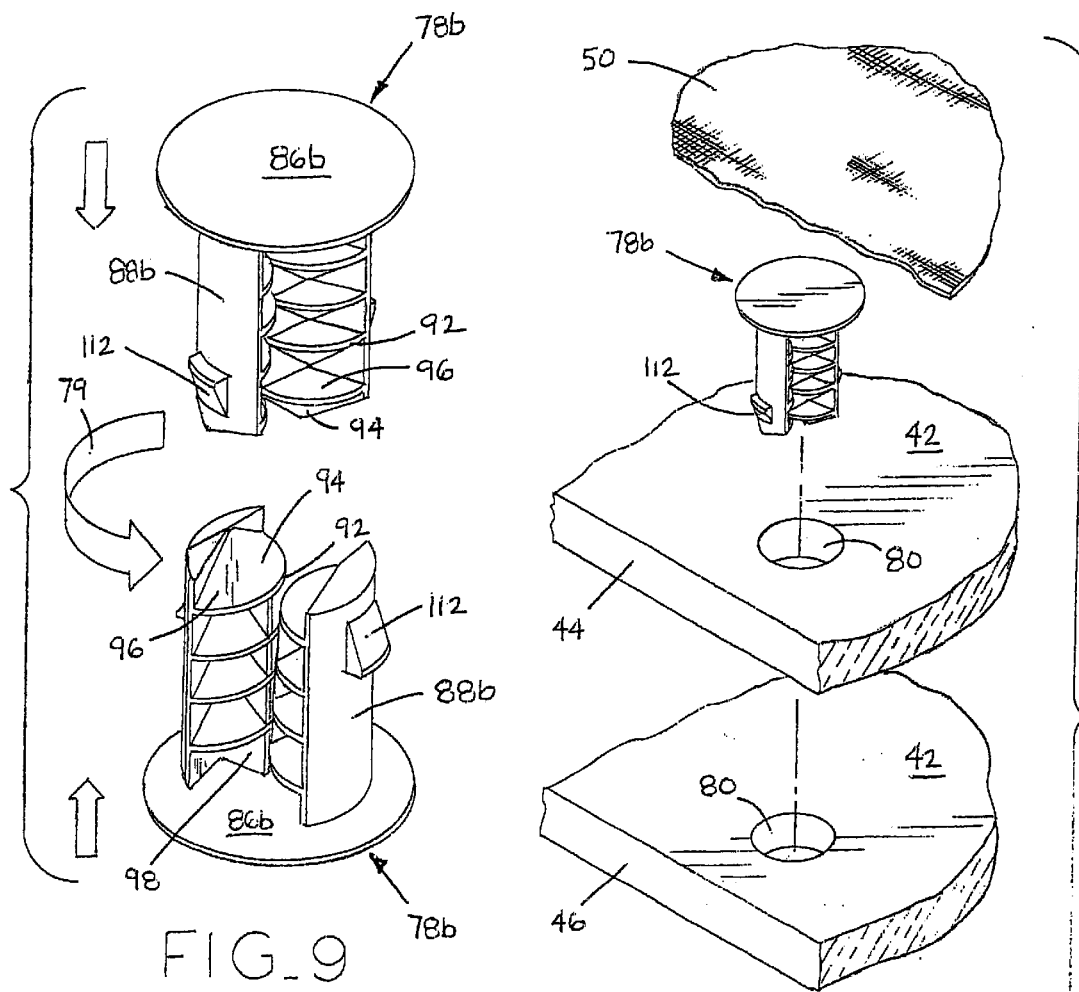
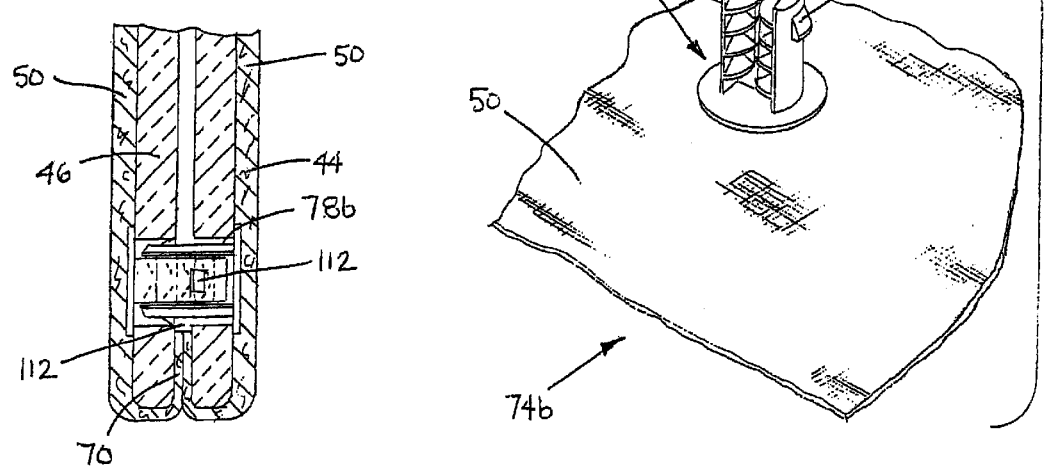
FIG_9
FIG_11
FIG_10

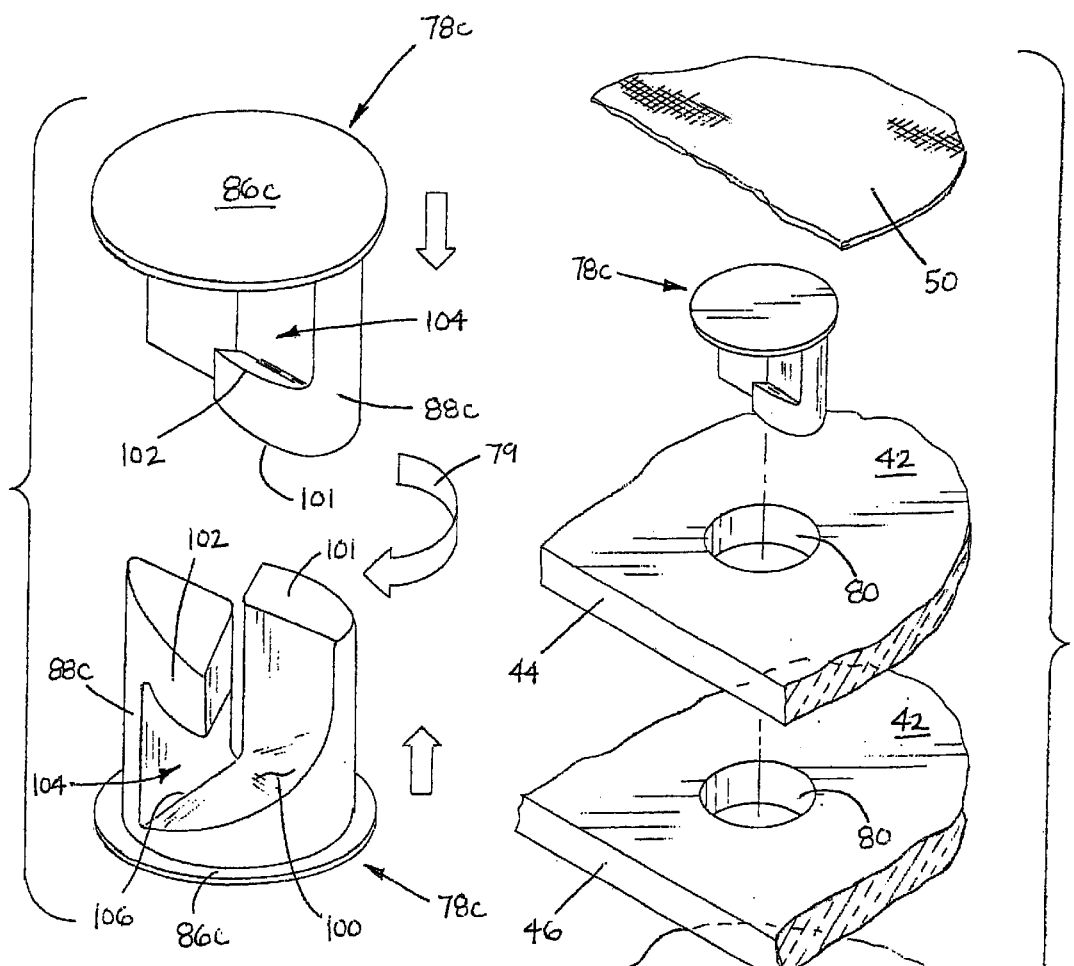
FIG_14
FIG_15
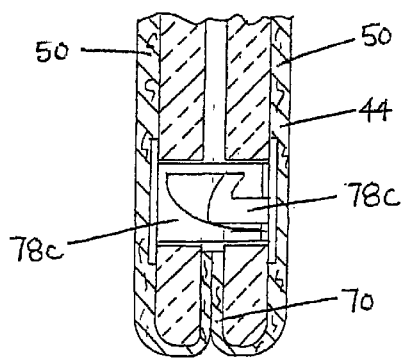
FIG_16

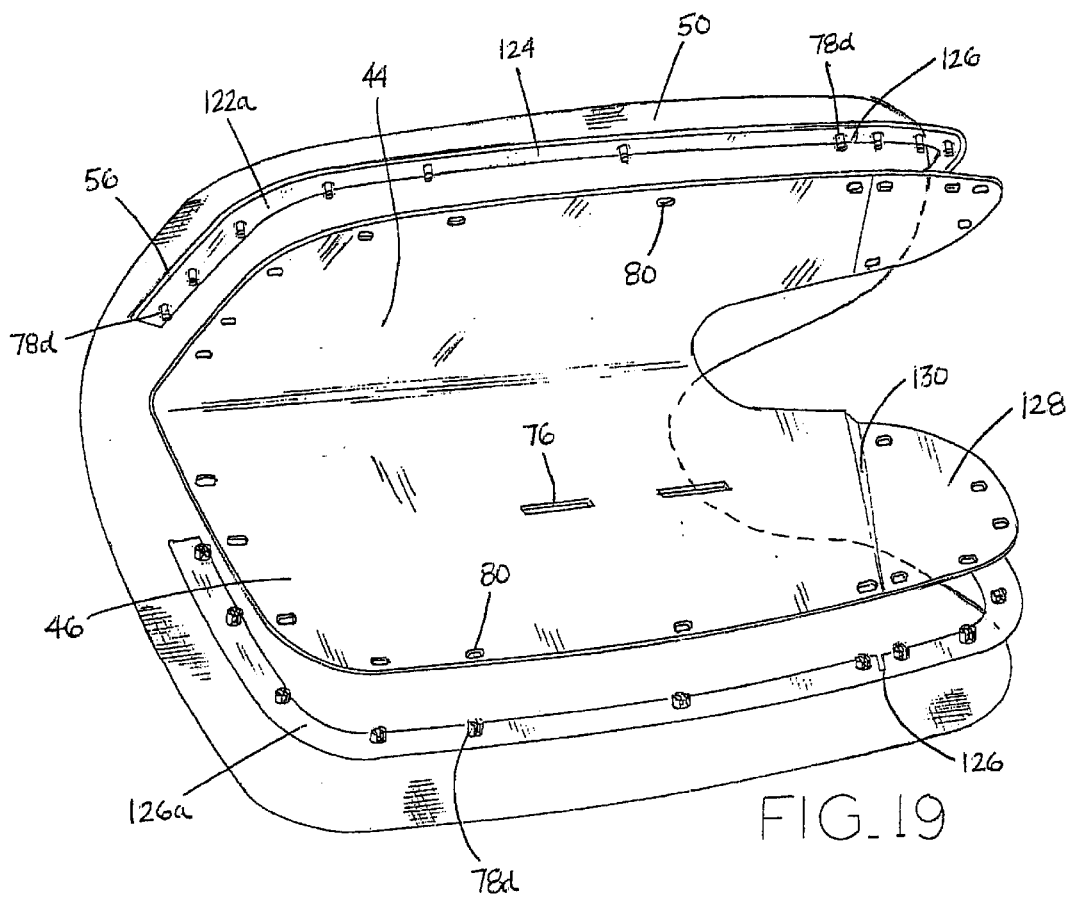
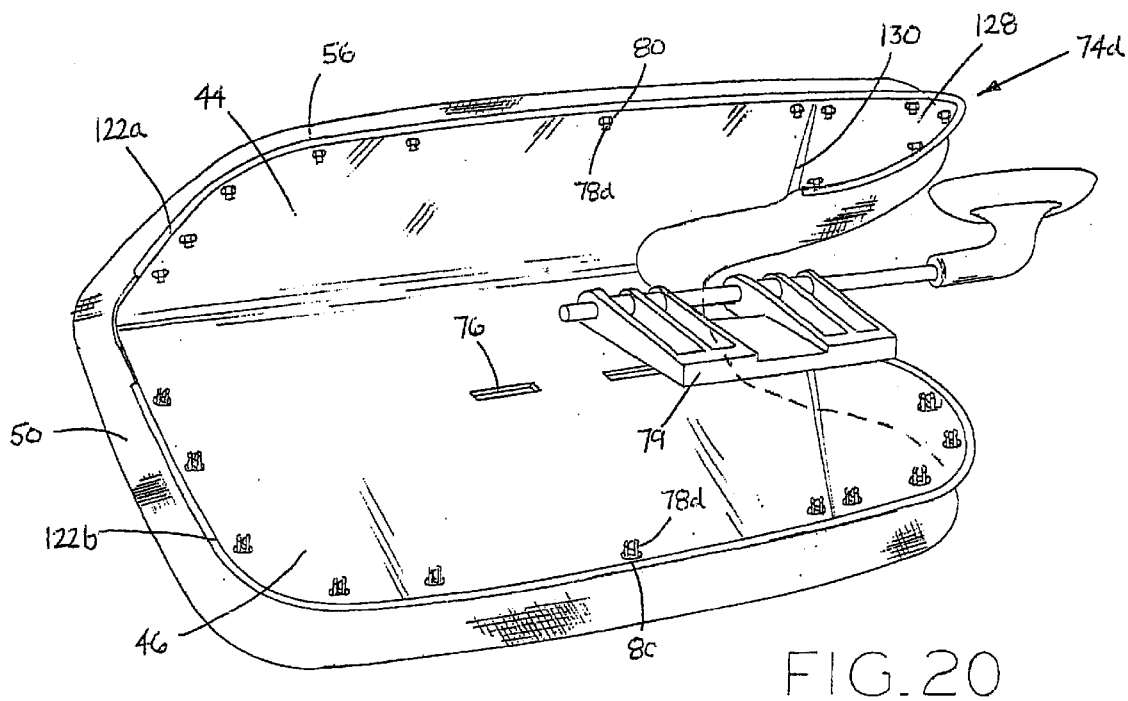

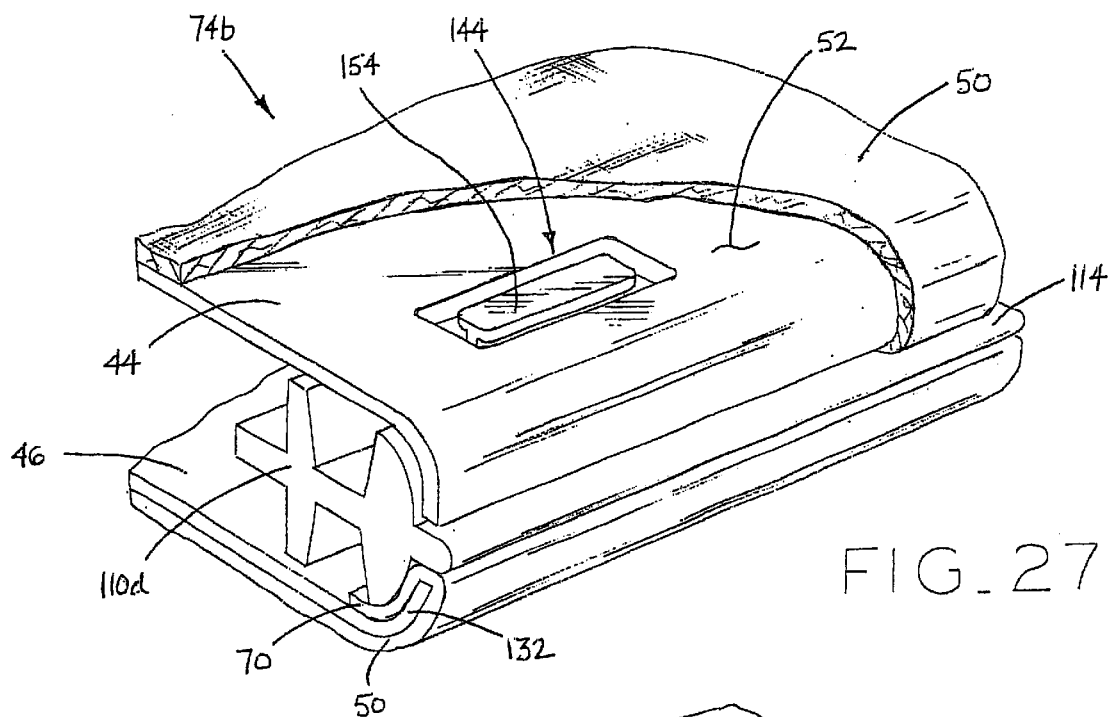
FIG_27
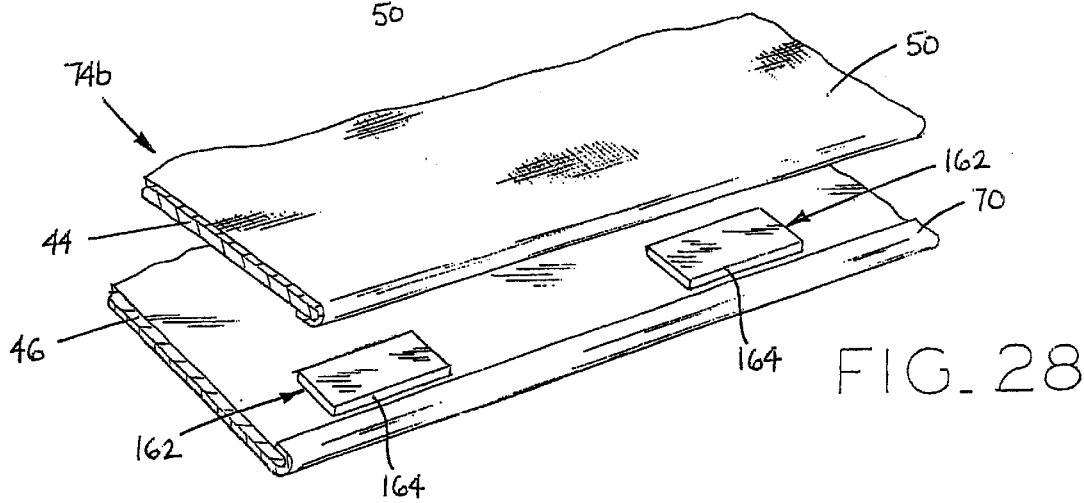
FIG_28
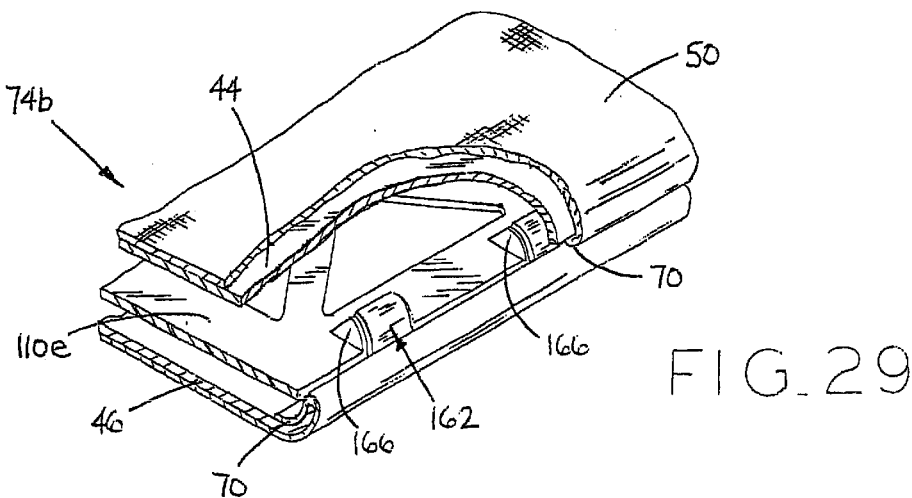
FIG_29

CLIP LOCK VISOR

RELATED APPLICATIONS

This application is a divisional of U.S. patent application Ser. No. 09/788,241, filed on Feb. 16, 2001.

BACKGROUND OF THE INVENTION

1. Field of the Invention

The present invention relates generally to sun visors for vehicles, the sun visors of the type which include an outer covering which folds unto itself. In particular, the present invention relates to the manner in which the folded halves of such outer coverings are attached to one another during assembly of the sun visor.

2. Description of the Related Art

A prior sun visor design is disclosed in U.S. patent application Ser. No. 6,527,328, issued on Mar. 4, 2003, assigned to the assignee of the present application, the disclosure of which is hereby incorporated by reference. The sun visor disclosed in the '328 patent generally includes an outer upholstery cover and a foundation, in which the foundation folds unto itself and is covered by the outer upholstery cover. A pair of bead member sections, each having a bulbous bead portion therearound which corresponds to the edge of the sun visor, are attached to the foundation, and edges of the upholstery cover are tucked into the interior of the sun visor and secured thereto with adhesive. Finally, adhesive is applied around the interior edges of the foundation, and the foundation is folded unto itself to define two foundation halves which are secured to one another by the adhesive to complete the assembly of the sun visor, with the bulbous head portions of the bead member sections together defining a rounded edge around the periphery of the sun visor.

The foregoing sun visor may be manufactured using an automated process including several individual assembly steps. In one such step, the bead member sections are attached to the foundation such that stakes projecting from the bead member sections protrude through receiving holes in the foundation. The stakes are then heat fused, such that the heads of the stakes deform and flatten to secure the bead member sections to the foundation. The upholstery cover is then attached to the foundation such that peripheral edges of the upholstery cover fold around the edges of the foundation and are secured to the foundation by adhesive.

Next, the sun visor is securely held in a predefined, exact position by a clamping apparatus as an automatic adhesive application head follows a predetermined, computer-controlled path to apply a beading of liquid adhesive around the edges of the foundation. Thereafter, the foundation is folded unto itself in a folding jig which subsequently holds the foundation halves together under pressure for a predetermined amount of time to allow the adhesive to set to complete the assembly of the sun visor.

Although the above-described sun visor design has proven successful, manufacturing the sun visor requires many individual assembly steps, as described above, with each step requiring expensive and complex machinery. The adhesive itself, which is used to secure the sun visor components together, is also rather expensive. In addition, the difficulty of re-tooling the automated process to manufacture different visor designs increases with the complexity and number of automated assembly steps.

What is needed it a sun visor which is both easier and less expensive to manufacture than the above-described sun visor, yet which provides a secure and durable connection between the foundation halves of the sun visor.

SUMMARY OF THE INVENTION

The present invention provides a sun visor, the sun visor generally including a foundation which may be folded unto itself to form two foundation halves, and an upholstery cover disposed over the foundation, where the foundation halves include connecting elements which engage one another to secure the foundation halves together. A frame member may be disposed between the folded foundation halves, the frame member including connecting elements which engage corresponding connecting elements of the foundation halves to secure the foundation halves to the frame member.

The connecting elements may be, for example, a plurality of clips associated with each foundation half, such that when the foundation halves are pressed together, corresponding clips engage one another to secure the foundation halves together with a snap lock connection. The clips may be disposed and retained within apertures in the foundation halves. Optionally, the foundation halves may include recesses in the external surfaces thereof around each aperture, the recesses receiving the heads of the clips such that the external surfaces of the foundation halves are substantially flush with the heads of the clips to allow the upholstery cover to uniformly cover the foundation halves and hide the clips from view.

The connecting elements may include a pair of connecting strips which are respectively associated with the foundation halves and include a plurality of clips formed therewith, with the clips of the pair of connecting strips engaging one another when the foundation halves are pressed together to secure the foundation halves together. Rather than clips, the connecting strips may optionally include a plurality of engaging rachet legs, or a plurality of posts formed with one connecting strip which engage a corresponding plurality of locking fingers of another connecting strip.

Additionally, a frame member may be disposed between the foundation halves, the frame member including a plurality of apertures therein through which the clips extend to engage one another to secure the foundation halves together, with the frame member sandwiched between the foundation halves. Alternatively, the frame member may include a plurality of clip receptacles alternatingly disposed in opposite sides thereof, with the clips of the foundation halves engaging the clip receptacles to secure the foundation halves to the frame member. The frame member may optionally include a rounded beading disposed externally of the foundation halves and the upholstery cover, the rounded beading forming an edge portion of the sun visor.

In addition to interlocking clips, the present invention provides interlocking systems to secure the foundation halves of the sun visor together. For example, the sun visor may include a frame member having a plurality of slots on opposite sides of the frame member, the foundation halves including a plurality of integrally formed tabs which are received within the slots of the frame member to lock the foundation halves to opposite sides of frame member. Alternatively, the frame member may include a plurality of T-shaped tabs extending from opposite sides thereof, and the foundation halves may include a plurality of recessed cavities formed therein which include slots, the T-shaped tabs slidingly received within the slots to secure the foundation halves to opposite sides of the frame member.

Additionally, adhesive strips may be used to secure the foundation halves of the sun visor together, the adhesive strips having exposed adhesive on opposite sides thereof. The adhesive strips may be sandwiched between the foundation halves to directly secure the foundation halves together, or may be sandwiched between each foundation half and a frame member to secure the foundation halves to the frame member.

Advantageously, the various interlocking connections between the foundation halves, or between the foundation halves and the frame member, obviate the use of expensive adhesive to secure the foundation halves together, thereby reducing the cost and difficulty of manufacturing the sun visor. Also, the interlocking foundation halves of the sun visor may be secured to one another in a single step, thereby eliminating several of the above-described assembly steps associated with heat staking, adhesive application, and holding the folded foundation halves together under pressure to allow the adhesive to cure. The sun visor of the present invention may therefore be assembled using an automated manufacturing process which is less complex and expensive than the prior process.

Similarly, the adhesive strips also reduce the cost and difficulty of manufacturing the sun visor by obviating the use of a liquid adhesive which must be mechanically applied, after which the sun visor is held under pressure for the adhesive to set.

In one form thereof, a sun visor is provided, including a substantially flat foundation folded unto itself to form two foundation halves, the halves having corresponding shapes that define an edge of the sun visor; a cover disposed over the foundation and forming an exterior surface of the sun visor; and at least one connecting element associated with each foundation half, corresponding connecting elements of the two foundation halves engaging one another to secure the foundation halves together.

In another form thereof, a sun visor is provided, including a substantially flat foundation folded unto itself to form two foundation halves, the halves having corresponding shapes that define an edge of the sun visor; a cover disposed over the foundation and forming an exterior surface of the sun visor; a frame member disposed intermediate the foundation halves, the frame member including a rounded bead member disposed along the edge of said sun visor externally of the foundation and the upholstery cover; at least one first connecting element associated with each foundation half, and at least two second connecting elements associated with the frame member, the first connecting elements respectively engaging the second connecting elements to secure the foundation halves to the frame member.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1 is an exploded perspective view of a prior sun visor assembly, including the foundation, upholstery cover, and bead member sections;

FIG. 2 is a perspective view of the sun visor assembly of FIG. 1, shown with only part of the upholstery cover folded over the edge of the foundation to illustrate the heat stake attachment of the bead member sections to the foundation, wherein only some of the stakes are fused to the foundation;

FIG. 3 is a fragmentary sectional view showing a bead member section associated with the foundation prior to heat stake fusion;

FIG. 4 is a fragmentary sectional view showing a bead member section secured to the foundation after heat stake fusion;

FIG. 5 is a fragmentary sectional view of the assembled sun visor assembly of FIGS. 1 and 2;

FIG. 6 is a perspective view of connecting elements, shown as a pair of first clips, being pressed together into engagement;

FIG. 7 is a fragmentary exploded view of a sun visor assembly of the present invention, showing the clips of FIG. 6, the foundation halves, and the upholstery cover;

FIG. 8 is a fragmentary sectional view of the assembled sun visor assembly of FIG. 7;

FIG. 9 is a perspective view of connecting elements, shown as a pair of second clips, being pressed together into engagement;

FIG. 10 is a fragmentary exploded view of an another sun visor assembly of the present invention, showing the clips of FIG. 9, the foundation halves, and the upholstery cover;

FIG. 11 is a fragmentary sectional view of the assembled sun visor assembly of FIG. 10;

FIG. 14 is a perspective view of connecting elements, shown as a pair of third clips, being pressed together into engagement;

FIG. 15 is a fragmentary exploded view of an another sun visor assembly of the present invention, showing the clips of FIG. 14, the foundation halves, and the upholstery cover;

FIG. 16 is a fragmentary sectional view of the assembled sun visor assembly of FIG. 15;

FIG. 19 is an exploded perspective view of an another sun visor assembly of the present invention, showing the foundation, the upholstery cover, and a pair of first connecting strips;

FIG. 20 is an perspective view of the sun visor assembly of FIG. 19, showing the first connecting strips associated with the foundation, and also showing a hinge block for placement between the foundation halves;

FIG. 27 is a fragmentary view of a sun visor assembly including the foundation halves of FIG. 25 connected to the frame member of FIG. 26;

FIG. 28 is a fragmentary view of a further sun visor assembly of the present invention, showing a pair foundation halves which are secured to one another by adhesive strips;

FIG. 29 is a fragmentary view of a further sun visor assembly of the present invention, showing a pair foundation halves which are each secured to a frame member by adhesive strips;

FIG. 34b is a fragmentary view of the assembled sun visor assembly of FIG. 34a.

Figure 12:
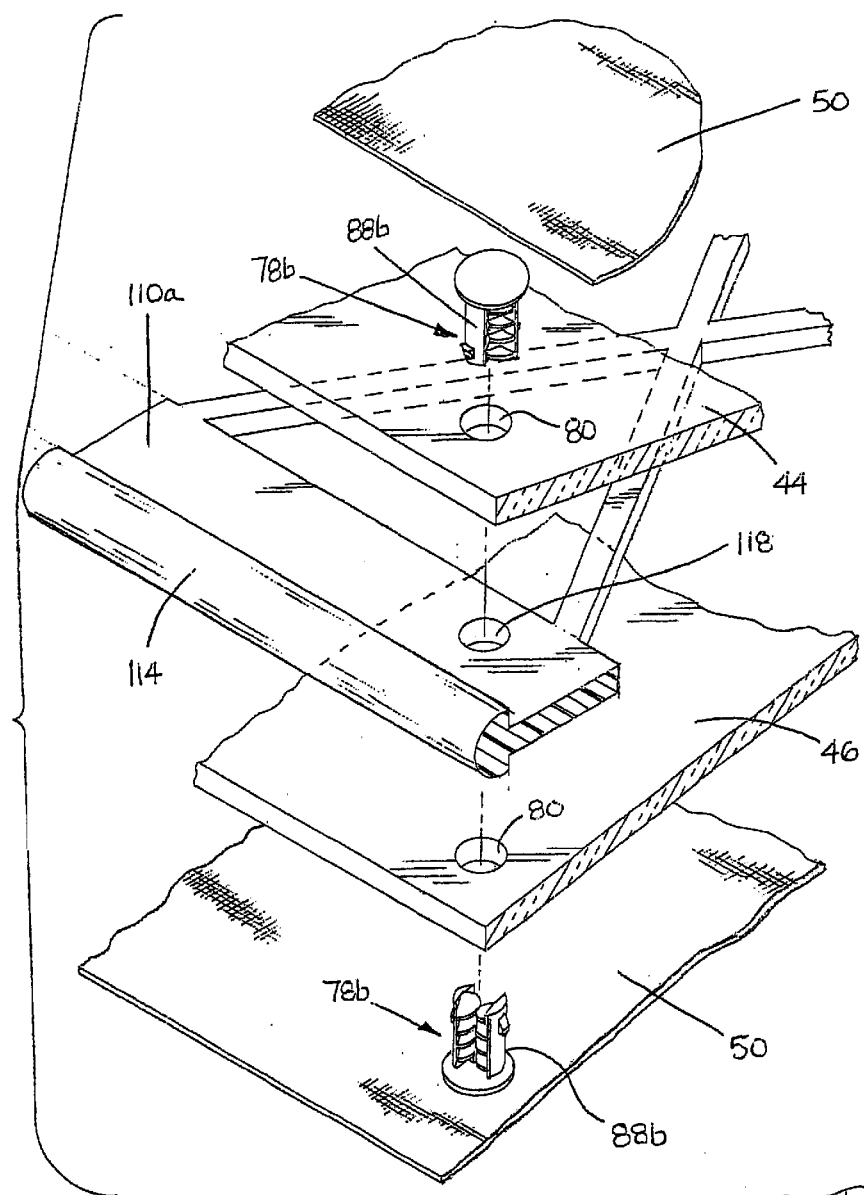
FIG. 12 is a fragmentary exploded view of an another sun visor assembly of the present invention, showing a frame member disposed between the foundation halves, and a pair of clips securing the foundation halves together with the frame member therebetween.

Corresponding reference characters indicate corresponding parts throughout the several views. The exemplifications set out herein illustrate preferred embodiments of the invention, in several forms, and such exemplifications are not to be construed as limiting the scope of the invention in any manner.

DETAILED DESCRIPTION

Referring to FIGS. 1–5, a prior sun visor assembly 40 is shown, including a substantially flat foundation 42 which may be folded unto itself to form two foundation halves 44, 46 (shown unfolded in FIGS. 1 and 2). Foundation halves 44, 46 have corresponding shapes that, when folded together, define edge 48 of sun visor assembly 40, as shown in FIG. 5. Upholstery cover 50 covers foundation 42 and forms an exterior surface 52 of visor assembly 40. Visor assembly 40 additionally includes bead member sections 54 having bulbous portions 56 which, when pressed together when foundation halves 44, 46 are secured to one another as shown in FIG. 5, form bead member 58 which partially defines edge 48 of the sun visor. Bead member sections 54 additionally include stems 60 having a plurality of stakes 62 extending therefrom, which fit through corresponding apertures 64 formed in foundation 42. FIG. 3 illustrates a stake 62 prior to heat stake fusion, with stake 62 extending through aperture 64 in foundation 42. Stakes 62 are formed of a plastic material, such as polypropylene or ABS plastic, which melts and deforms during heat staking, as shown in FIG. 4, forming cap 66 that locks stem 60 of bead member section 54 against foundation 42 to secure bead member section 54 to foundation 42.

After stakes 62 have been fused to secure bead member sections 54 to foundation 42, foundation 42 is placed upon upholstery cover 50, and edge portions 70 of upholstery cover 50 are wrapped around the edges of foundation 42 and attached to the interior periphery of foundation 42 using an adhesive. A beading of adhesive 72 is then applied around the interior edge of foundation 42, and foundation 42 is folded unto itself to form two foundation halves 44, 46 secured to one another by adhesive 72, as described above.

Exemplary embodiments of sun visors of the present invention are shown in FIGS. 6–35, which sun visors include connecting elements for securing the foundation halves of the sun visor to one another, or alternatively, include a frame member which is disposed between the foundation halves and which includes connecting elements for securing the foundation halve to the frame member.

One embodiment, visor assembly 74a, is shown in FIGS. 7 and 8, and includes upholstery cover 50 and foundation 42, similar to prior visor assembly 40 shown in FIGS. 1–5. Foundation 42 may be made from any suitable material which is moderately stiff, yet which may be folded unto itself to form foundation halves 44, 46, such as kraft paper. Upholstery cover 50 may be made from suitable upholstery materials such as fabric, vinyl, or cloth with bonded foam backing, for example. Visor assembly 74a also includes a plurality of connecting elements associated therewith, the connecting elements shown as clips 78a which are received within clip apertures 80 of foundation halves 44, 46.

Referring to FIG. 6, clips 78a each include head 86a with a pair of parallel legs 88a depending therefrom. Legs 88a each include at least two pointed parallel arms 90 depending laterally from opposite sides of each leg 88a. Clips 78a may be pressed together as shown in FIG. 6 such that legs 88a engage one another, with clips 78a disposed at a 90° angle with respect to one another. Each leg 88a of one clip extends between a pair of legs 88a of the opposite clip 78a with arms 90 of clips 78a interlockingly engaging one another. Clips 78a are made of a resilient plastic material which allows legs 88a and arms 90 to resiliently bend and/or deform as needed, allowing clips 78a to engage one another with a snap lock connection.

If corresponding clips 78a are not initially disposed at a 90° angle with respect to one another, the engagement between arms 90 of opposing clips 78a automatically rotates clips 78a with respect to one another until clips 78a are disposed at a 90° angle with respect to one another, as shown by arrow 79 in FIG. 6. Therefore, corresponding clips 78a associated with foundation halves 44, 46 do not have to be aligned exactly at a 90° angle with respect to one another before foundation halves 44, 46 are pressed together to engage clips 78a, which simplifies the manufacture of sun visor assembly 74a.

Visor assembly 74b, similar to visor assembly 74a, is shown in FIGS. 10 and 11, including clips 78b which engage one another to secure foundation halves 44, 46 together as described above. Clips 78b, as may be seen in FIG. 9, include heads 86b with a pair of parallel legs 88b depending therefrom, each leg 88b including a row of internally directed catches 92. Each catch 92 includes a tapered lower side 94 and a top surface 96 which is substantially flat. Legs 88b also include integral support ribs 98 which bisect catches 92.

As shown in FIG. 9, clips 78b may be pressed together with clips 78b disposed at a 90° angle with respect to one another, wherein tapered lower sides 94 of catches 92 of one clip 78b engage tapered lower sides 94 of catches 92 of an opposite clip 78b to bend legs 88b of clips 78b slightly outwardly until corresponding catches 92 pass one another, whereupon legs 88b return to their original positions with top surfaces 96 of corresponding catches 92 contacting one another to lock clips 78b together. This process is sequentially repeated as clips 78b are pressed further toward one another, such that catches 92 sequentially engage one another in a ratcheting, stepwise manner. Advantageously, this manner of engagement allows the same clips 78b to be used with foundations 42 of different thicknesses such that, for example, when a relatively thin foundation is used, three or four catches 92 of corresponding clips 78b may engage one another, and when a relatively thicker foundation is used, one or two catches 92 of corresponding clips 78b may engage one another.

Similar to clips 78a, and as shown by arrow 79 in FIG. 9, if corresponding clips 78b are not initially disposed at a 90° angle with respect to one another, contact between tapered lower sides 94 of catches 92 automatically rotates clips 78b with respect to one another until clips 78b are disposed at a 90° angle with respect to one another, whereupon catches 92 of clips 78b may properly sequentially engage one another as described above.

Sun visor assembly 74c, similar to sun visor assemblies 74a and 74b, is shown in FIGS. 15 and 16, including clips 78c which engage one another to secure foundation halves 44, 46 together as described above. As shown in FIG. 14, each clip 78c includes head 86c, and a pair of parallel legs 88c depending from head 86c. Each leg 88c includes a curved ramp surface 100 on one side thereof, and a hook 102 projecting from a sloped distal end 101 of each leg 88c on a side thereof opposite curved ramp surface 100. When associated clips 78c are pressed together, each leg 78c of one clip 78c extends between legs 88c of another clip 78c, with hooks 102 contacting opposing curved ramped surfaces 100, causing clips 78c to rotate 90° with respect to one another before hooks 102 of each leg 88c are snap-fit into the recessed areas 104 defined between lower edges 106 of curved ramp surfaces 100 and the undersides of each hook 102.

Similar to clips 78a and 78b, and as shown by arrow 79 in FIG. 14, if corresponding clips 78c are not initially disposed with respect to one another as shown in FIG. 14, contact between sloped distal ends 101 of opposing clips 78c automatically rotates clips 78c with respect to one another until clips 78c are disposed as shown in FIG. 14, whereupon clips 78c may engage one another as described above.

Figure 30A:
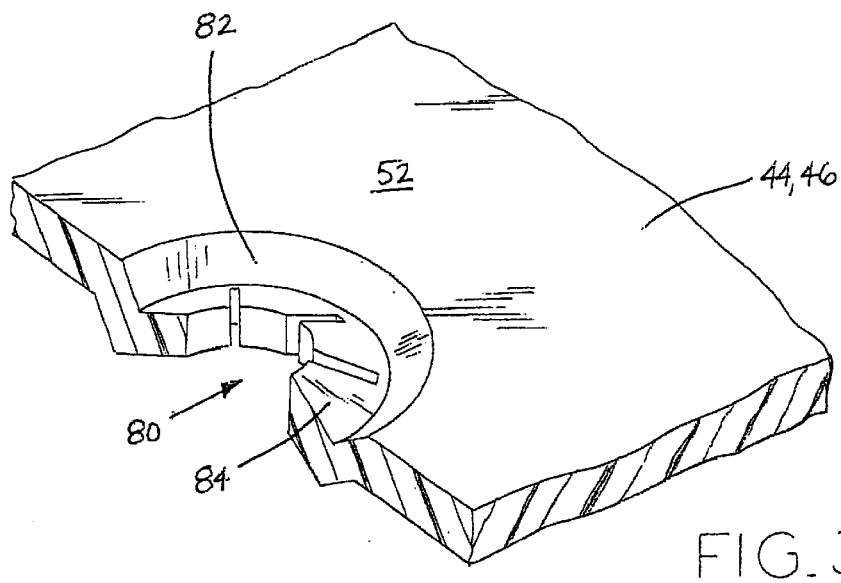
FIG. 30a is a fragmentary view of a foundation half of a sun visor assembly, shown with a recess around an aperture thereof, and a plurality of segment fingers.
Figure 30B:
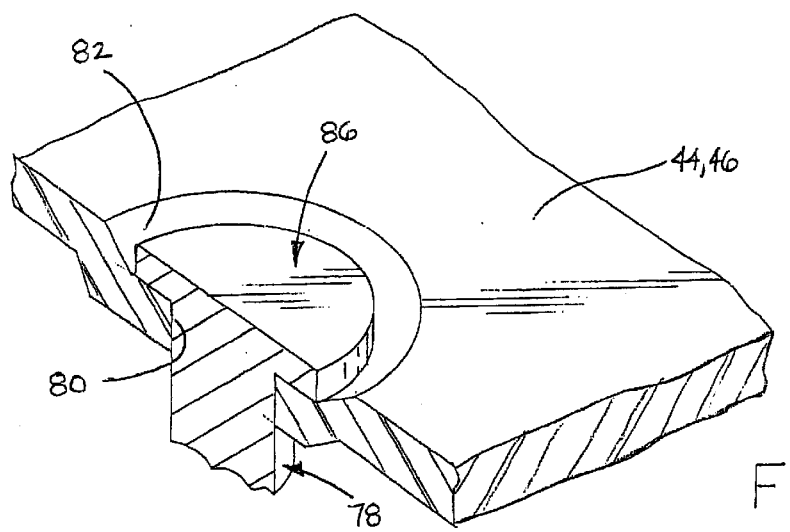
FIG. 30b is a fragmentary view of the foundation half of FIG. 30a, with a clip disposed in the aperture.
Figure 30C:
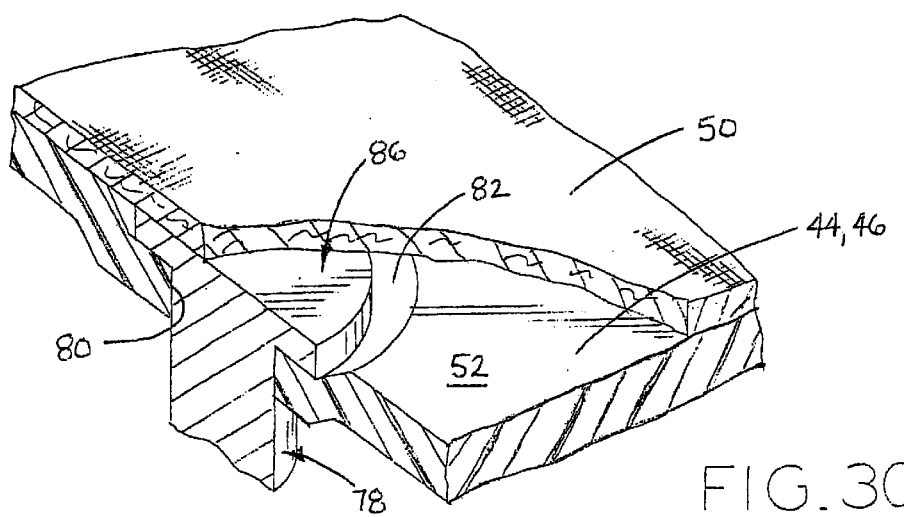
FIG. 30c is a fragmentary view of the foundation half and clip of FIG. 30b, further showing a portion of an upholstery cover.

As shown in FIGS. 30a–c, foundation halves 44, 46 may include recesses 82 formed in exterior surfaces 52 of foundation halves 44, 46 around clip apertures 80. Recesses 82 may include a plurality of segment fingers 84 which are pretensioned to deform and frictionally retain clips 78a–c upon insertion of clips 78a–c into clip apertures 80. Heads 86a–c of clips 78a–c are received within recesses 82 such that the top surfaces of heads 86a–c are substantially flush with external surface 52 of foundation 42, thereby allowing upholstery cover 50 to uniformly cover and span both foundation 42 and heads 86a–c of clips 78a–c, such that clips 78a–c are hidden from view in the assembled sun visor, and upholstery cover 50 does not need to stretch around clips 78.

As shown in connection with clips 78b in FIGS. 9–11, each of clips 78a–c may additionally include outwardly directed, external hooks 112 which engage the interior surface of foundation 42 to secure clips 78 within clip apertures 80 of foundation 42.

Figure 13:
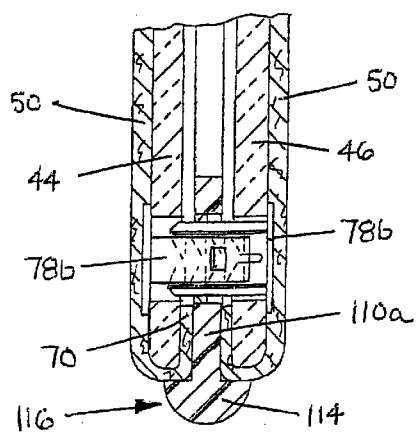
FIG. 13 is a fragmentary sectional view of the assembled sun visor assembly of FIG. 12.
Figure 17:
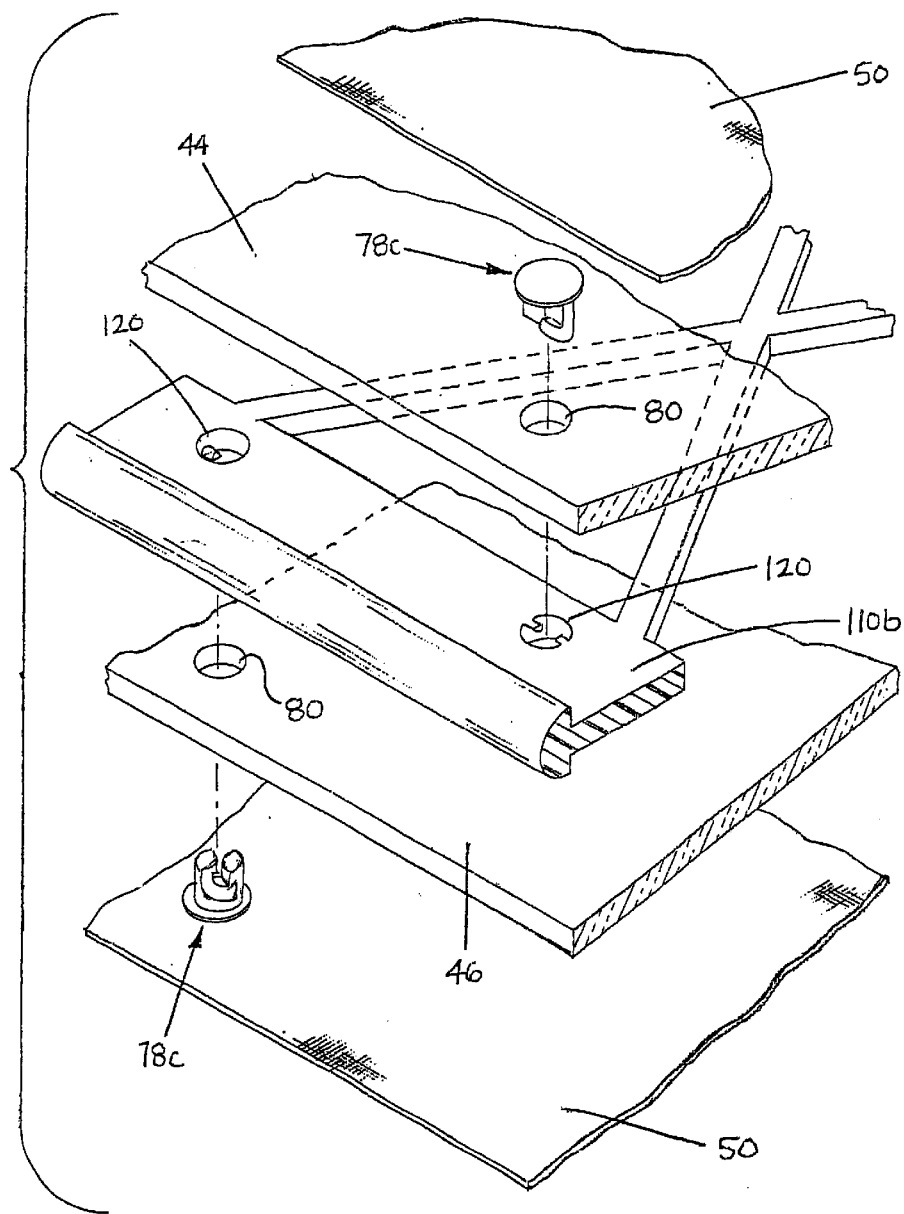
FIG. 17 is a fragmentary exploded view of an another sun visor assembly of the present invention, showing a frame member having clip receptacles and disposed between the foundation halves, and a pair of clips securing the foundation halves to the frame member.
Figure 18:
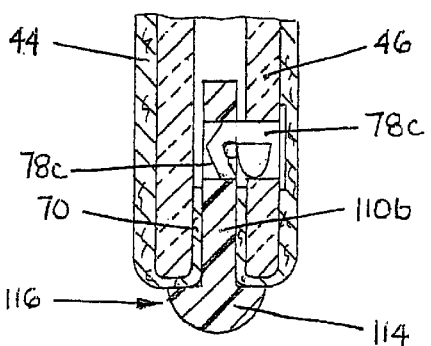
FIG. 18 is a fragmentary sectional view of the assembled sun visor assembly of FIG. 17.

Referring to FIGS. 12, 13, 17, and 18, clips 78a–c may additionally be used with frame members 110a, 110b, which are disposed between foundation halves 44, 46. Frame members 110a, 110b may be made of a plastic material such as polypropylene, ABS plastic, or nylon, and may include rounded bead portion 114 forming beaded edge 116 of the sun visor, as shown in FIGS. 13 and 18. As shown in FIGS. 12 and 13, frame member 110a includes a plurality of openings 118 therein, which may receive legs 88a–c of any of clips 78a–c therethrough, such as legs 88b of clips 78b shown in FIGS. 12 and 13, for example, with legs 88a–c of clips 78a–c engaging one another as described above to secure foundation halves 44, 46 to opposite sides of frame member 110a.

As shown in FIGS. 17 and 18, frame member 110b includes a plurality of connecting elements, shown as clip receptacles 120, for example, which are disposed in an offset, alternating fashion in opposite sides of frame member 110b. Clip receptacles 120 may be shaped to lockingly receive any of clips 78a–c therein, such as clips 78c shown in FIGS. 17 and 18 for example, to secure foundation halves 44, 46 to opposite sides of frame member 110b. In this manner, foundation halves 44, 46 are not secured to one another by corresponding clips 78a–c; rather, clips 78a–c associated with each foundation half 44, 46 engage clip receptacles 120 provided in frame member 110b to secure foundation halves 44, 46 to opposite sides of frame member 110.

Figure 21:
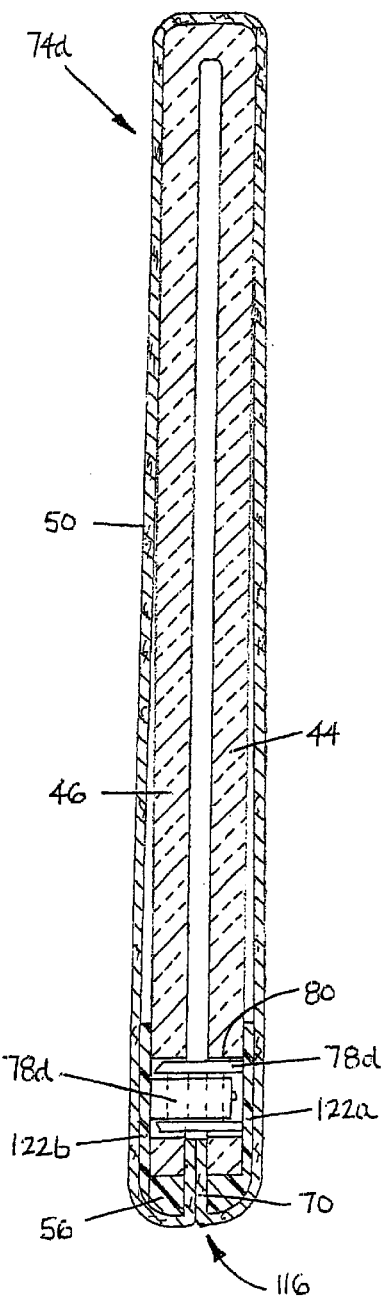
FIG. 21 is a sectional view of the assembled sun visor assembly of FIG. 20.

Sun visor assembly 74d, shown in FIGS. 19–21, is similar to sun visor assemblies 74a–c. However, rather than including a plurality of clips 78a–c associated with each foundation half 44, 46, sun visor assembly 78d includes first connecting strips 122a, 122b associated with respective foundation halves 44, 46. Each connecting strip 122a, 122b includes stem portion 124 having a plurality of integrally formed clips 78d which project therefrom at spaced intervals. Clips 78d of connecting strips 122a, 122b may be substantially identical to any of clips 78a–c which are described above. Connecting strips 122a, 122b may additionally include bulbous portions 56 which, when pressed together as shown in FIG. 21, form rounded bead member 58 which defines beaded edge 116 around the periphery of the sun visor. Cutouts 76 may be formed in foundation 42 to accommodate protrusions (not shown) of hinge block 79 to mount hinge block 79 within visor assembly 74d. Additionally, a clip assembly or vanity mirror assembly may be mounted within visor assembly 74d in a similar manner. Such vanity mirror assemblies, clip assemblies, and hinge blocks may be similar to those disclosed in U.S. Pat. No. 5,580,118, assigned to the assignee of the present application, the disclosure of which is hereby incorporated by reference.

As may be understood from the above description of clips 78a–c, clips 78d of corresponding connecting strips 122a, 122b are disposed at 90° with respect to one another to facilitate engagement between corresponding clips 78d, as described above in connection with clips 78a–c. Connecting strips 122a, 122b additionally include cutout slots 126 which allow rounded flat portion 128 of sun visor assembly 74 to be bent along crease lines 130. Foundation halves 44, 46 may include a plurality of apertures 80 along the peripheral edges thereof, which receive clips 78d of connecting strips 122a. 122b therethrough to connect connecting strips 122 with foundation halves 44, 46. Optionally, each clip 78d of connecting strips 122 may further include external hooks 112, as described above, which engage interior surfaces of foundation halves 44, 46 in order to secure connecting strips 122a, 122b to foundation halves 44, 46. Advantageously, connecting strips 122a, 122b, having a plurality of clips 78d integrally formed therewith, allow foundation halves 44, 46 of sun visor assembly 74d to be clip locked together without the use of a plurality of individual clips 78a–c, thereby reducing the number of components of sun visor assembly 74d and simplifying the complexity and cost of assembly thereof.

Figure 31A:
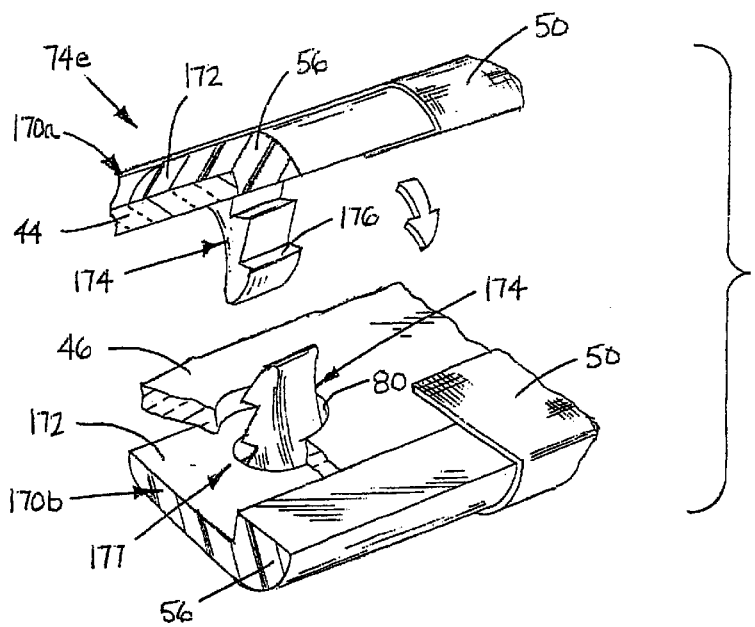
FIG. 31a is a fragmentary view of a further sun visor assembly of the present invention, showing a pair of second connecting strips associated with a pair of foundation halves and an upholstery cover covering the foundation halves, the foundation halves being pressed together.
Figure 31B:
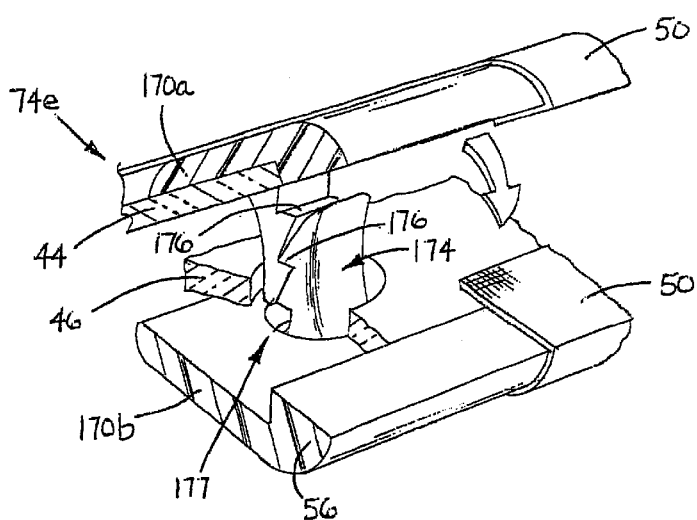
FIG. 31b is a fragmentary view of the sun visor assembly of FIG. 31a, with the foundation halves being pressed further together to engage the ratchet legs of the second connecting strips.
Figure 31C:
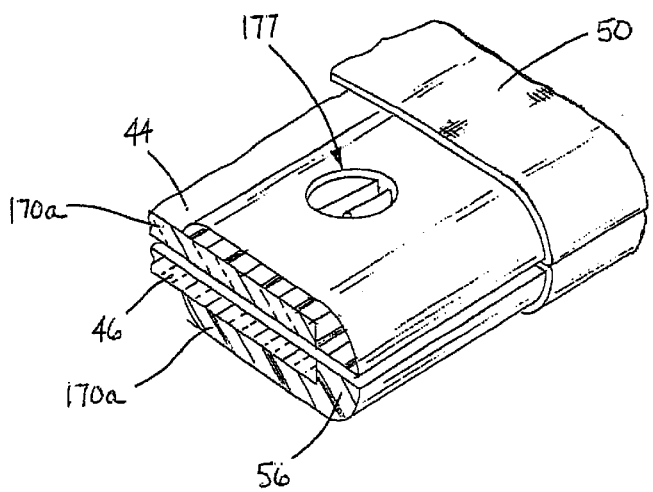
FIG. 31c is a fragmentary view of the assembled sun visor assembly of FIGS. 31a–b.
Figure 32:
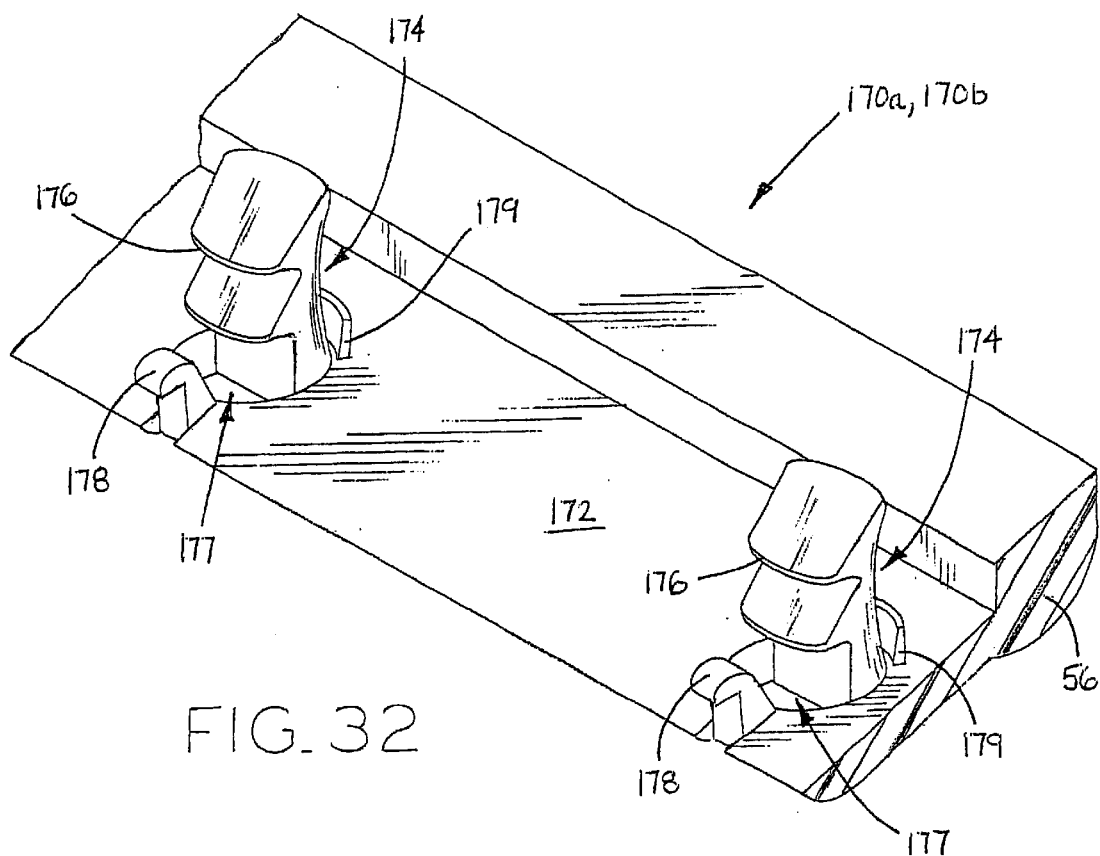
FIG. 32 is a fragmentary view of one of the second connecting strips of FIGS. 31a–c, showing ratchet legs, hooks, and ribs thereof.
Figure 33:
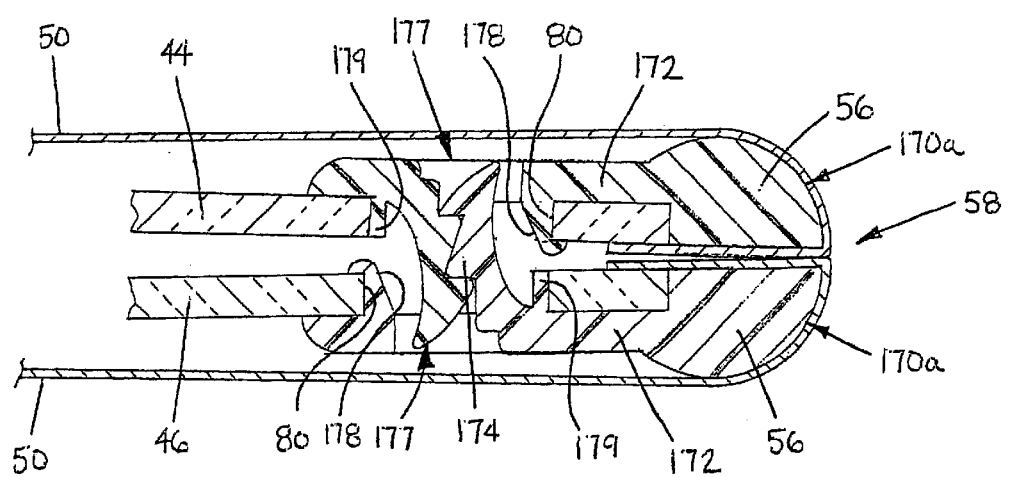
FIG. 33 is a fragmentary sectional view of the assembled sun visor assembly of FIGS. 31c.

Sun visor assembly 74e is shown in FIGS. 31a–33, which is similar to sun visor assembly 74d shown in FIGS. 19–21, and includes second connecting strips 170a, 170b, each having stem portion 172 with a plurality of integral ratchet legs 174 formed therewith. Ratchet legs 174 each include a plurality of catches 176 formed therewith. As shown in FIG. 32, stem portions 172 further include hooks 178 and ribs 179 formed therein on opposite sides of ratchet legs 174. When ratchet legs 174 are inserted through apertures 80 in foundation halves 44, 46 as shown in FIG. 33, hooks 178 engage the interior surfaces of foundation halves 44, 46, and ribs 179 abut the interior of apertures 80, such that hooks 178 and ribs 179 cooperate to secure second connecting strips 170a, 170b to foundation halves 44, 46, respectively.

As shown in FIGS. 31a and 31b, when foundation halves 44, 46 of visor assembly 74e are pressed together, catches 176 of opposing ratchet legs 174 engage one another in a ratcheting, stepwise manner, with each ratchet leg 174 of one connecting strip 170a, 170b extending through a corresponding opening 177 in the stem portion 172 of an opposite connecting strip 170a, 170b. Referring to FIG. 33, it may be seen that the distal ends of ratchet legs 174 do not extend past stem portions 172 in the opposite connecting strips 170a, 170b, such that upholstery cover 50 may smoothly and uniformly cover connecting strips 170a, 170b.

Advantageously, the ratcheting, stepwise engagement between ratchet legs 174 of connecting strips 170a, 170b allows connecting strips 170a, 170b to be used with foundations 42 of different thicknesses such that, for example, when a relatively thick foundation is used, one or two catches 176 of corresponding connecting strips 170a, 170b may engage one another, and when a relatively thinner foundation is used, two or three catches 176 of corresponding connecting strips 170a, 170b may engage one another. Connecting strips 170, 170b each may include bulbous portions 56 which, when pressed together as shown in FIG. 33, form rounded bead member 58 which defines a beaded edge around the periphery of the sun visor.

Figure 34A:
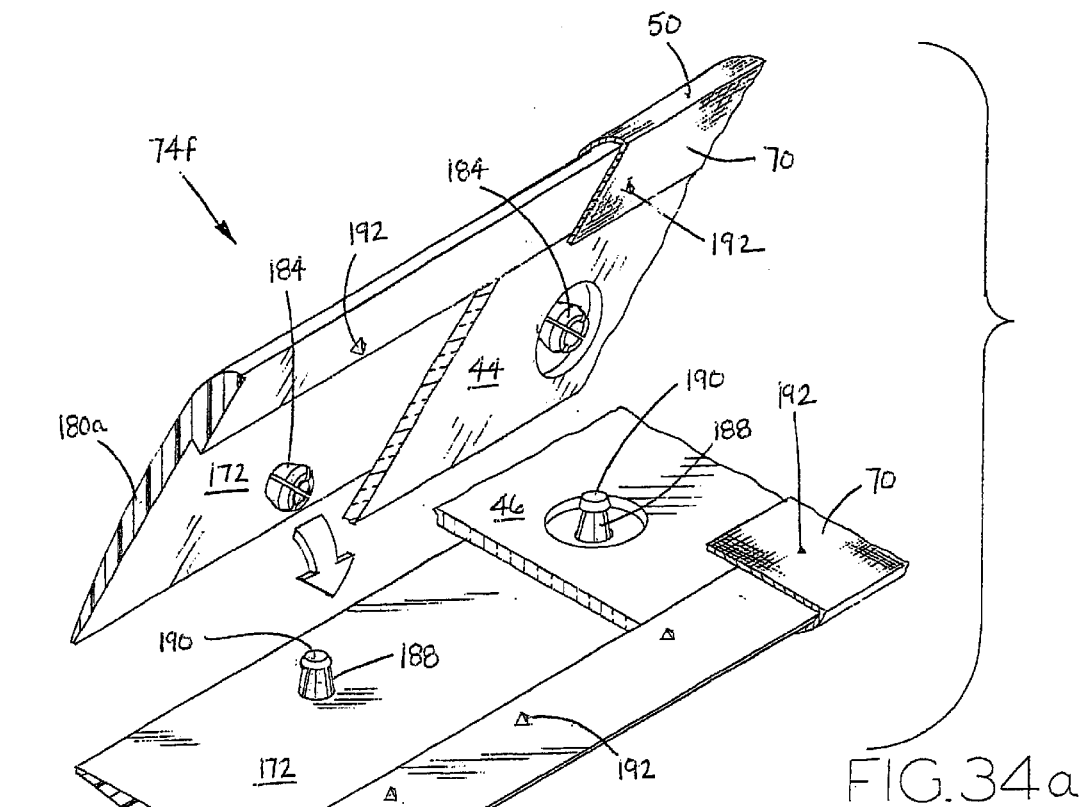
FIG. 34a is a fragmentary view of a further sun visor assembly of the present invention, showing a pair of third connecting strips associated with a pair of foundation halves and an upholstery cover covering the foundation halves, the foundation halves being pressed together.
Figure 34B:
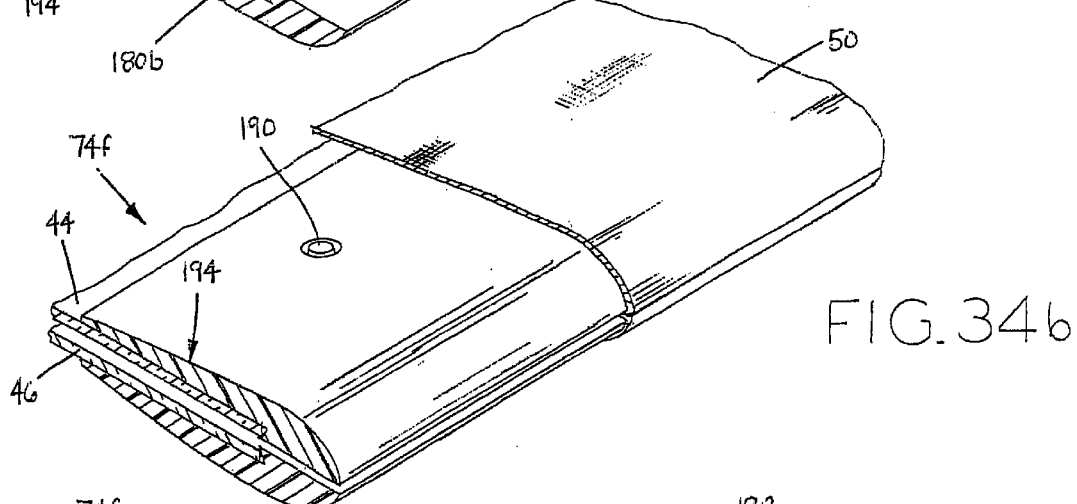
Figure 35:
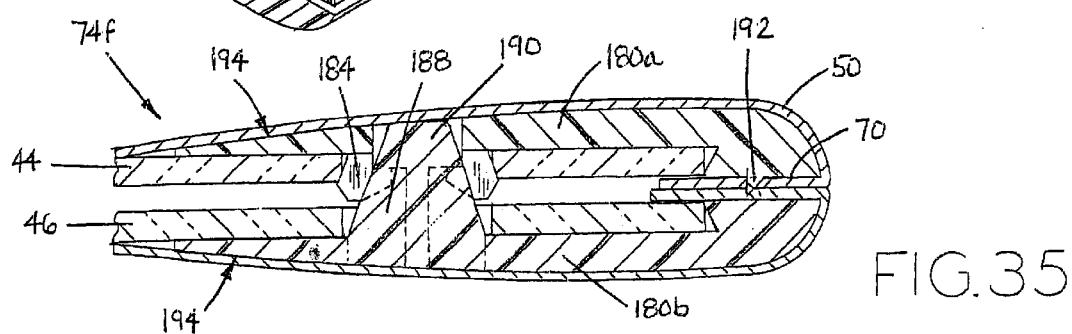
FIG. 35 is a fragmentary sectional view of the assembled sun visor assembly of FIG. 34b.

Sun visor assembly 74f is shown in FIGS. 34a–35, including third connecting strips 180a, 180b. Connecting strips 180a, 180b are similar to connecting strips 170a, 170b, and such similar features thereof will not be further discussed herein. As shown in FIG. 34, connecting strip 180a includes locking fingers 184, which lockingly receive and retain heads 190 of posts 188 formed with connecting strip 180b to secure connecting strips 180a, 180b to one another. Connecting strips 180a, 180b additionally include catch hooks 192, which retain edge portion 70 of upholstery cover 50 when wrapped around the edge of connecting strips 180a, 180b, as well as tapering trailing edges 194, which provide a smooth transition for upholstery cover 50 from connecting strips 180a, 180b to foundation halves 44, 46, respectively. Catch hooks 192 and trailing edges 194 may be included with connecting strips 122a–b and 170a–b.

In addition to the above-described embodiments in which foundation halves 44, 46 may be secured to one another or to frame members 110a, 110b using connecting elements such as clips 78a–c or connecting strips 122a–b, 170a–b, or 180a–b, foundation halves 44, 46 may also be secured to a frame member using interlocking systems, which are described below, and which include connecting elements formed in each of the foundation halves and frame members.

Figure 22A:
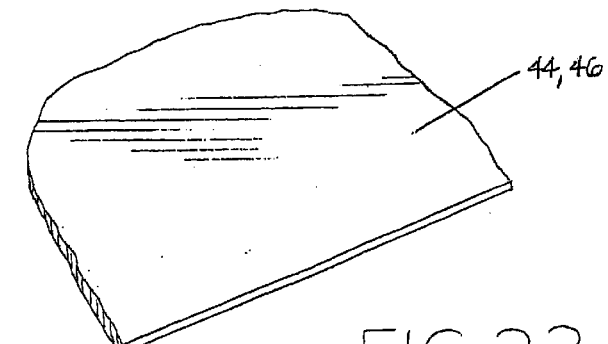
FIG. 22a is a fragmentary perspective view of a foundation half of another sun visor assembly of the present invention.
Figure 22B:
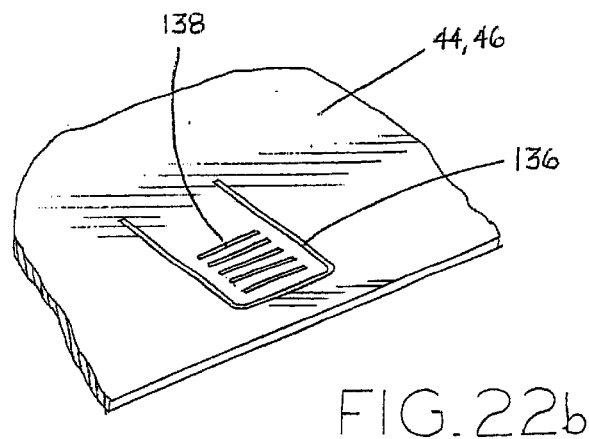
FIG. 22b is a fragmentary perspective view of the foundation half of FIG. 22a, shown with a tab outline and a plurality of recessed notches formed therein.
Figure 22C:
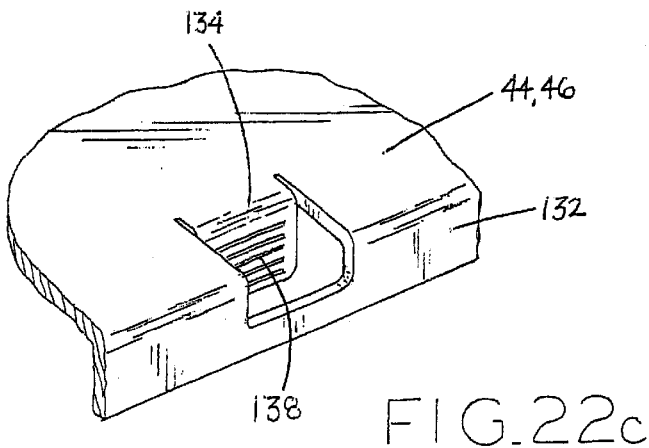
FIG. 22c is a fragmentary perspective view of the foundation half of FIG. 22b, the foundation half including a bent edge portion and a depending tab.
Figure 23:
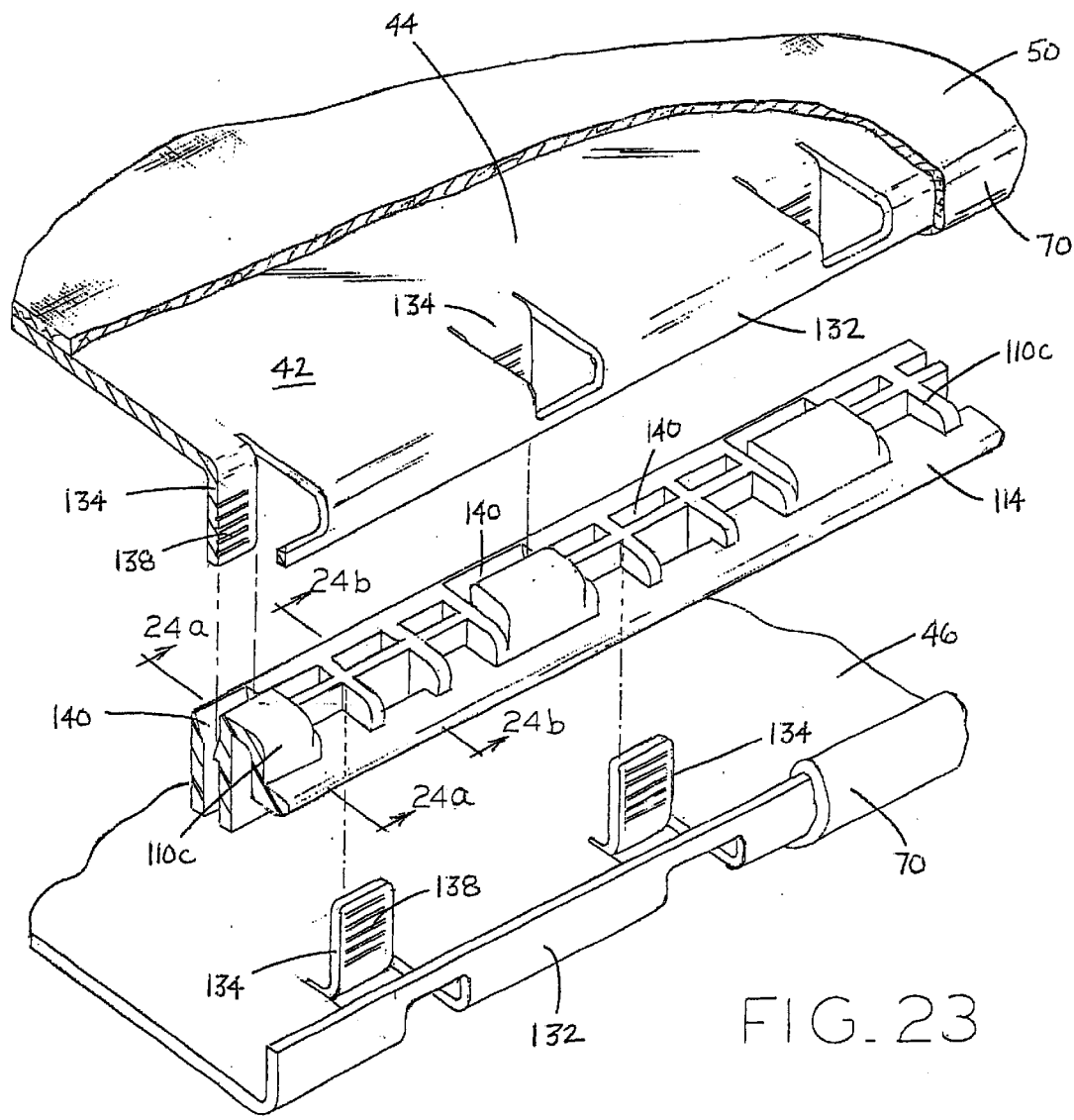
FIG. 23 is a fragmentary exploded view of another sun visor assembly of the present invention, including the foundation halves of FIG. 22c, and a frame member disposed between the foundation halves to which the foundation halves are attached.

As shown in FIG. 23, sun visor assembly 74g includes foundation halves 44, 46 which are formed with bent edge portions 132 and connecting elements, the connecting elements shown in FIG. 23 as tabs 134. With reference to FIGS. 22a–c, in forming bent edge portions 132 and tabs 134, outlines 136 of tabs 134 are first die cut in foundation halves 44, 46, and a plurality of recessed notches 138 are pressed into foundation halves 44, 46 within outlines 136. Then, the portions of foundation halves 44, 46 within outlines 136 are bent to form tabs 134 which depend from foundation halves 44, 46 as shown in FIG. 22c. Additionally, edges 48 of foundation halves 44, 46 adjacent tabs 134 may also be bent as shown in FIG. 22c to form bent edge portions 132 of foundation halves 44, 46.

Figure 24A:
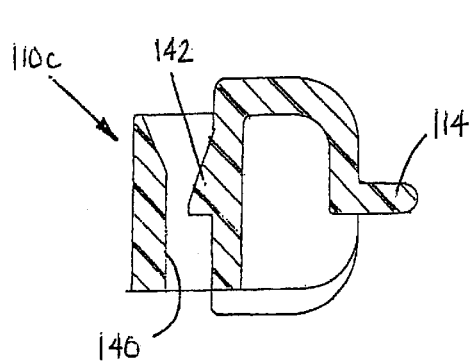
FIG. 24a is a sectional view along line 24a—24a of FIG. 23.
Figure 24B:
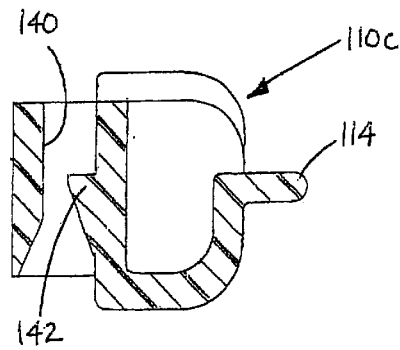
FIG. 24b is a sectional view along line 24b—24b of FIG. 23.

As shown in FIG. 23, frame member 110c includes connecting elements, shown as a plurality of offset, alternating slots 140 formed therein, including locking tabs 142 disposed within each slot 140, as shown in FIGS. 24a and 24b. Tabs 134 of foundation halves 44, 46 are pressed into slots 140 such that locking tabs 142 of slots 140 sequentially engage recessed notches 138 formed in tabs 134 in a ratcheting, stepwise manner to secure foundation halves 44, 46 to frame member 110c. Frame member 110c may additionally include rounded bead member 58 projecting therefrom, against which bent edge portions 132 of foundation halves 44, 46 abut when foundation halves 44, 46 are secured to frame member 110c. As shown in FIG. 23, upholstery cover 50 is sandwiched between bent edge portions 132 of foundation halves 44, 46 and rounded bead member 58 of frame member 110c to secure upholstery cover 50 to foundation 42, with rounded bead member 58 of frame member 110c extending externally of upholstery cover 50 to define a beaded edge of the sun visor.

Figure 25:
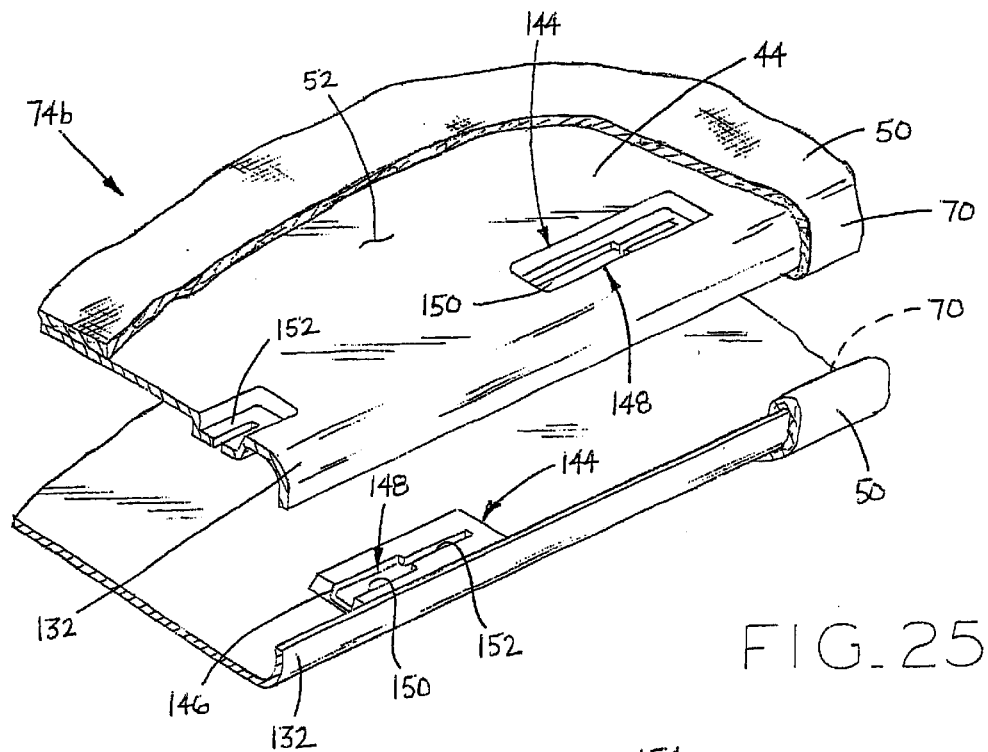
FIG. 25 is a fragmentary view of a pair of foundation halves of a further sun visor assembly of the present invention, the foundation halves each including recessed cavities with slots therein.
Figure 26:
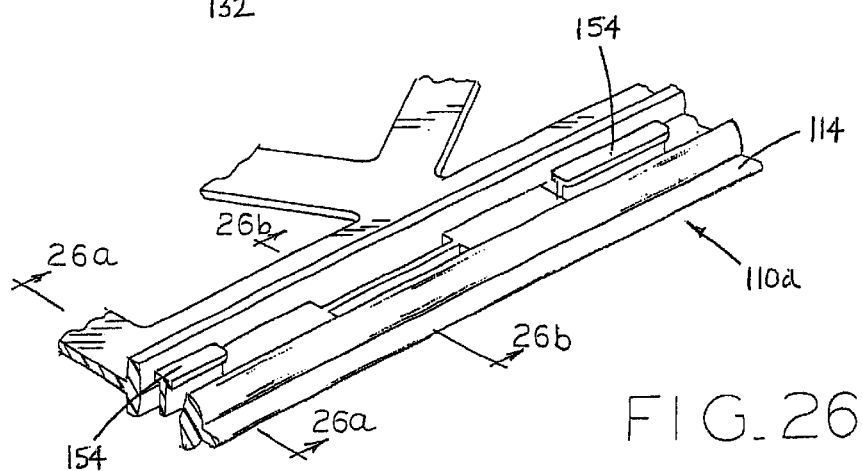
FIG. 26 is a perspective view of a frame member which may be connected to the foundation halves of FIG. 25, the frame member including a plurality of T-shaped tabs projecting therefrom.

Referring to FIGS. 25–27, sun visor assembly 74*h* includes foundation halves 44, 46 having connecting elements, the connecting elements shown as recessed cavities 144 formed within foundation halves 44, 46. Recessed cavities 144 include insertion openings 146 and slots 148, with slots 148 having wide portions 150 and narrow portions 152. Additionally, foundation halves 44, 46 may include bent edge portions 132 adjacent recessed cavities 144. Frame member 110*d* is disposed between foundation halves 44, 46 and includes connecting elements shown as a plurality of offset, alternating T-shaped tabs 154 projecting from opposite sides of frame member 110*d*.

Figures 26A, 26B:
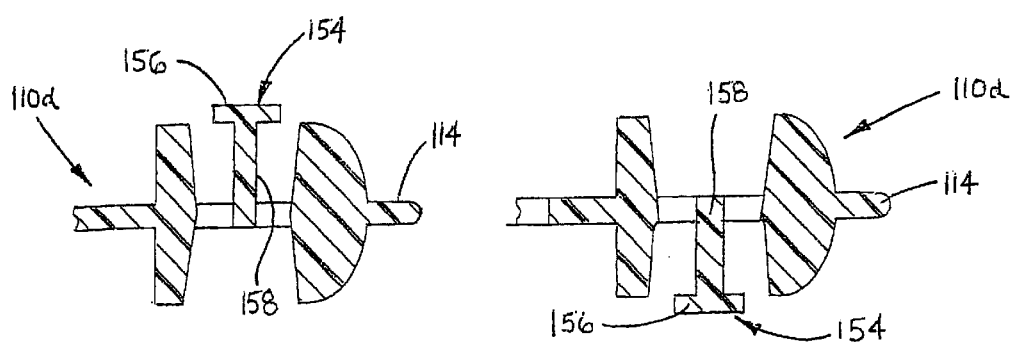
FIG. 26a is a sectional view along line 26a—26a of FIG. 26.
FIG. 26b is a sectional view along line 26b—26b of FIG. 26.

To secure foundation halves 44, 46 to frame member 110*d*, heads 156 of T-shaped tabs 154 are received within insertion openings 146 and wide portions 150 of slots 148, whereupon frame member 110*d* and foundation halves 44, 46 are moved laterally with respect to one another such that stems 158 of T-shaped tabs 154 pass into narrow portions 152 of slots 148 to secure foundation halves 44, 46 to frame member 110, as may be seen from FIGS. 25–26*b*. Optionally, recessed cavities 144 may be shaped to be deeper in the area around wide portions 150 of slots 148, and relatively shallower around narrow portions 152 of slots 148, such that heads 146 of T-shaped tabs 154 frictionally engage slots 148 to a greater extent around narrow portions 152 of slots 148 than wider portions 150 of slots 148 to provide a greater friction fit between T-shaped tabs 154 and recessed cavities 144. As shown in FIG. 27, heads 156 of T-shaped tabs 154 are substantially flush with exterior surfaces 52 of foundation halves 44, 46, thereby allowing upholstery cover 50 to uniformly cover and span both foundation halves 44, 46 and T-shaped tabs 154, such that T-shaped tabs 154 are hidden from view in the assembled sun visor, and upholstery cover 50 does not need to stretch around T-shaped tabs 154.

Additionally, frame member 110*d* may include rounded bead portion 114, against which bent edge portions 132 of foundation halves 44, 46 abut on opposite sides of rounded bead portion 114, with upholstery cover 50 sandwiched between bent edge portions 132 of foundation halves 44, 46 and rounded bead portion 114 of frame member 110*d* to secure upholstery cover 50 to foundation 42. Rounded bead portion 114 of frame member 110 is disposed externally of foundation halves 44, 46 and upholstery cover 50, and forms an outer edge of the sun visor.

Sun visor assembly 74*i* is shown in FIG. 28, in which foundation halves 44, 46 are secured to one another using adhesive strips 162. Adhesive strips 162 include adhesive pad 164 having an exposed adhesive on opposite sides thereof, such that, as shown in FIG. 28, when adhesive strips 162 are sandwiched between foundation halves 44, 46, adhesive strips 162 secure foundation halves 44, 46 to one another, with edge portions 70 of upholstery cover 50 wrapped around the edges of foundation halves 44, 46 and tucked between foundation halves 44, 46 to secure upholstery cover 50 to foundation 42. Alternatively, adhesive strips 162 may be strips of a double-sided adhesive tape. Suitable adhesive strips and double-sided adhesive tapes include, for example, VHB™ Double Coated Foam Tapes and Adhesive Transfer Tapes, available from 3M Company of St. Paul Minn. (VHB™ is a trademark of 3M Company). However, other suitable adhesive strips and double-sided adhesive tapes are readily available.

As shown in FIG. 28, a plurality of adhesive strips 162 may be spaced at intervals between foundation halves 44, 46 to secure foundation halves 44, 46 to one another. Optionally, adhesive strips 162 may be cut into various shapes to correspond to the contours of the edges of foundation halves 44, 46, and/or to ensure maximum contact between foundation halves 44, 46 and adhesive strips 162.

As shown in FIG. 9, frame member 110*e* is disposed between foundation halves 44, 46, and may include a plurality of adhesive strip mounts 166 to which adhesive strips 162 are adhered. Adhesive strip mounts 166 may be integrally formed with frame member 110*c*, and may be curved as shown in FIG. 29 to correspond with bent edge portions 132 of foundation halves 44, 46. Upholstery cover 50 may be wrapped around the edges of foundation halves 44, 46 and tucked into the interior of sun visor 74 between foundation halves 44, 46 and frame member 110*e* to secure upholstery cover 50 to foundation 42. Further, adhesive strips 162 may be adhered both to edges 70 of upholstery cover 50 and to bent edge portions 132 of foundation halves 44, 46 to further secure upholstery cover 50, foundation halves 44, 46 and frame member 110*e* together.

As shown in FIGS. 8, 11, 13, 16, 18, 21, 23, 25, 27–29, 33, and 35, edge portions 70 of upholstery cover 50 are wrapped around the edges of foundation halves 44, 46, and are sandwiched between foundation halves 44, 46 or alternatively, between foundation halves 44, 46 and frame members 110*a–e*. Edge portions 70 of upholstery cover 50 may be secured to foundation halves 44, 46 using an adhesive, however, the interlocking engagement between foundation halves 44, 46 or between foundation halves 44, 46 and frame members 110*a–e* may be effected with sufficient force to sandwich edge portions 70 of upholstery cover 50 between foundation halves 44, 46 or between foundation halves 44, 46 and frame members 110 such that upholstery cover 50 is secured to foundation 42 without the use of an adhesive.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sun visor, comprising:
   a substantially flat foundation having two foundation halves, the foundation halves having corresponding shapes that define an edge of the sun visor;
   a cover disposed over the foundation and forming an exterior surface of the sun visor;
   a frame member disposed intermediate the foundation halves;
   at least one first connecting element associated with each of the foundation halves; and
   at least two second connecting elements associated with the frame member, the first connecting elements respectively engaging the second connecting elements to secure the foundation halves to the frame member.

2. The sun visor of claim 1, wherein the first connecting elements comprise clips, and the second connecting elements comprise clip receptacles integrally formed with the frame member.

3. The sun visor of claim 1, wherein the first connecting elements comprise tabs depending from said foundation halves, and said second connecting elements comprise slots within the frame member into which the tabs are received.

4. The sun visor of claim 3, wherein the frame member includes a rounded bead member disposed along the edge of the sun visor externally of the foundation and the cover.

5. The sun visor of claim 4, wherein the foundation halves include edges curved inwardly toward opposite sides of the bead member, the cover disposed around the curved edges and sandwiched between the foundation halves and the frame member.

6. The sun visor of claim 3, wherein the foundation halves are secured to opposite sides of the frame member, the slots alternatingly disposed in the opposite sides of the frame member.

7. The sun visor of claim 3, wherein the tabs each include a plurality of notches and the slots include hooks, the hooks each engaging one of the notches upon insertion of the tabs into the slots to lock the foundation halves to the frame member.

8. The sun visor of claim 1, wherein the first connecting elements comprise recessed cavities which depend from the foundation and include slots, and the second connecting elements comprise tabs which project from the frame member and are received within the slots.

9. The sun visor of claim 8, wherein the tabs are alternatingly disposed in the opposite sides of the frame member.

10. The sun visor of claim 8, wherein each tab includes a stem portion depending from the frame member and terminating in a head, and the slots include a larger portion receiving the heads therethrough and a smaller portion slidably receiving the stem portion to secure the foundation halves to the frame member.

11. The sun visor of claim 8, wherein the frame member includes a rounded bead member disposed along the edge of the sun visor externally of the foundation and the cover.

12. The sun visor of claim 11, wherein the foundation halves include edges curved inwardly toward opposite sides of the bead member, the cover disposed around the curved edges and sandwiched between the foundation halves and the frame member.

13. The sun visor of claim 1, wherein the frame member includes a rounded bead member disposed along the edge of the sun visor externally of the foundation and the cover.

* * * * *